(12) United States Patent
Lee et al.

(10) Patent No.: US 11,721,333 B2
(45) Date of Patent: Aug. 8, 2023

(54) ELECTRONIC APPARATUS AND CONTROL METHOD THEREOF

(71) Applicant: SAMSUNG ELECTRONICS CO., LTD., Suwon-si (KR)

(72) Inventors: Younghwa Lee, Suwon-si (KR); Jinhe Jung, Suwon-si (KR); Meejeong Park, Suwon-si (KR); Inchul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 16/766,496

(22) PCT Filed: Jan. 11, 2019

(86) PCT No.: PCT/KR2019/000477
§ 371 (c)(1),
(2) Date: May 22, 2020

(87) PCT Pub. No.: WO2019/146942
PCT Pub. Date: Aug. 1, 2019

(65) Prior Publication Data
US 2020/0380976 A1    Dec. 3, 2020

(30) Foreign Application Priority Data

Jan. 26, 2018 (KR) ........................ 10-2018-0009965

(51) Int. Cl.
*G10L 15/22* (2006.01)
*G06F 3/16* (2006.01)
(Continued)

(52) U.S. Cl.
CPC ............. *G10L 15/22* (2013.01); *G06F 3/167* (2013.01); *G06N 3/08* (2013.01); *G10L 15/08* (2013.01);
(Continued)

(58) Field of Classification Search
CPC ......... G10L 15/22; G10L 15/08; G10L 15/24; G10L 2015/088; G10L 15/16;
(Continued)

(56) References Cited

U.S. PATENT DOCUMENTS 7,813,526 B1    10/2010 Bourdev
8,325,886 B1 *  12/2012 Kirchhoff .......... G06Q 30/0267
                                                    704/277
(Continued)

FOREIGN PATENT DOCUMENTS

CN    105512164 A    4/2016
CN    106104569 A    11/2016
(Continued)

OTHER PUBLICATIONS

International Search Report (PCT/ISA/210) dated Apr. 12, 2019 issued by the International Searching Authority in International Application No. PCT/KR2019/000477.
(Continued)

*Primary Examiner* — Thuykhanh Le
(74) *Attorney, Agent, or Firm* — Sughrue Mion, PLLC

(57) ABSTRACT

The disclosure relates to an artificial intelligence (AI) system using a learned AI model according to at least one of machine learning, neural network, or a deep learning algorithm and applications thereof. In the disclosure, a control method of an electronic apparatus is provided. The control method comprises the steps of: displaying an image including at least one object receiving a voice; inputting the voice to an AI model learned by an AI algorithm to identify an object related to the voice among the at least one object included in the image and acquire tag information about the identified object; and providing the obtained tag information.

15 Claims, 27 Drawing Sheets

(51) Int. Cl.
*G06N 3/08* (2023.01)
*G10L 15/08* (2006.01)
*G10L 15/24* (2013.01)

(52) U.S. Cl.
CPC ........ *G10L 15/24* (2013.01); *G10L 2015/088* (2013.01)

(58) Field of Classification Search
CPC ......... G10L 2015/221; G10L 2015/225; G06F 3/167; G06F 3/04845; G06F 3/0488; G06F 16/5866; G06F 16/5854; G06F 3/0484; G06N 3/08; G06N 3/006; G06N 5/02; G06N 20/00
USPC ....................................................... 704/232
See application file for complete search history.

(56) References Cited

U.S. PATENT DOCUMENTS

| | | | | |
|---|---|---|---|---|
| 8,447,285 | B1* | 5/2013 | Bladon | H04M 7/0012 379/85 |
| 8,462,231 | B2 | 6/2013 | Nusbaum | |
| 8,793,129 | B2* | 7/2014 | Handa | G10L 15/26 704/235 |
| 9,311,525 | B2 | 4/2016 | Kim et al. | |
| 9,756,091 | B1* | 9/2017 | Davies | H04L 65/1089 |
| 9,916,864 | B2 | 3/2018 | An | |
| 10,289,919 | B2* | 5/2019 | Park | H04N 7/181 |
| 10,347,296 | B2 | 7/2019 | An | |
| 10,546,236 | B2* | 1/2020 | Gruenstein | G06F 1/324 |
| 2003/0152277 | A1 | 8/2003 | Hall, Jr. et al. | |
| 2004/0174434 | A1* | 9/2004 | Walker | H04N 1/32128 348/211.6 |
| 2005/0064374 | A1 | 3/2005 | Spector | |
| 2005/0192808 | A1* | 9/2005 | Sugiyama | H04M 1/271 707/E17.026 |
| 2008/0040111 | A1* | 2/2008 | Miyamoto | G10L 15/22 704/E15.04 |
| 2008/0189112 | A1* | 8/2008 | Cohen | G10L 17/00 704/260 |
| 2009/0150147 | A1 | 6/2009 | Jacoby et al. | |
| 2009/0228274 | A1* | 9/2009 | Terrell, II | G10L 15/22 704/235 |
| 2010/0332231 | A1* | 12/2010 | Nakano | G10L 15/063 704/E15.005 |
| 2011/0071832 | A1* | 3/2011 | Handa | G10L 15/26 704/E15.001 |
| 2011/0081075 | A1* | 4/2011 | Adcock | G06V 20/47 382/165 |
| 2012/0004904 | A1* | 1/2012 | Shin | G06F 16/35 704/9 |
| 2013/0036134 | A1* | 2/2013 | Neven | G06F 16/951 707/769 |
| 2013/0241834 | A1* | 9/2013 | Vennelakanti | G06F 40/253 345/158 |
| 2013/0317861 | A1* | 11/2013 | Tofte | G06Q 40/08 705/4 |
| 2013/0325462 | A1* | 12/2013 | Somekh | G06F 16/58 704/235 |
| 2013/0346068 | A1* | 12/2013 | Solem | G10L 15/26 704/9 |
| 2014/0081633 | A1* | 3/2014 | Badaskar | G10L 15/26 707/723 |
| 2014/0114643 | A1* | 4/2014 | Baker | G06F 40/169 704/9 |
| 2014/0160316 | A1* | 6/2014 | Hwang | H04N 1/00403 348/231.99 |
| 2014/0207466 | A1* | 7/2014 | Smadi | H04M 1/271 704/275 |
| 2014/0379704 | A1* | 12/2014 | Ukil | G06F 16/48 707/723 |
| 2014/0379757 | A1* | 12/2014 | Samuels | G06F 16/51 707/802 |
| 2015/0199401 | A1* | 7/2015 | Polehn | G10L 17/10 707/765 |
| 2015/0269420 | A1* | 9/2015 | Kim | G06F 21/32 382/118 |
| 2016/0042225 | A1* | 2/2016 | Barak | G06F 16/5866 382/118 |
| 2016/0086029 | A1* | 3/2016 | Dubuque | G06V 20/63 382/159 |
| 2016/0091964 | A1* | 3/2016 | Iyer | G06V 20/20 715/863 |
| 2016/0103830 | A1* | 4/2016 | Cheong | G06F 16/745 715/738 |
| 2016/0104511 | A1* | 4/2016 | An | G11B 27/10 386/241 |
| 2016/0180885 | A1* | 6/2016 | Arkenberg | G11B 27/10 386/282 |
| 2016/0267921 | A1* | 9/2016 | Dang | G06F 16/433 |
| 2017/0004821 | A1* | 1/2017 | Hirano | G10L 13/0335 |
| 2017/0024388 | A1* | 1/2017 | Bentley | G06F 16/9537 |
| 2017/0041523 | A1* | 2/2017 | Rifkin | G06F 3/017 |
| 2017/0075924 | A1* | 3/2017 | Rogers | H04W 4/18 |
| 2017/0076222 | A1* | 3/2017 | Khapra | G06F 16/3344 |
| 2017/0286058 | A1* | 10/2017 | Kim | G06T 7/00 |
| 2017/0287524 | A1* | 10/2017 | Jiang | G10L 25/57 |
| 2017/0300291 | A1* | 10/2017 | Lee | G06F 16/433 |
| 2018/0048823 | A1* | 2/2018 | Kang | H04N 5/23238 |
| 2018/0107685 | A1* | 4/2018 | Kale | G06V 10/758 |
| 2018/0204602 | A1 | 7/2018 | An | |
| 2018/0314689 | A1* | 11/2018 | Wang | G10L 15/1822 |
| 2018/0332140 | A1* | 11/2018 | Bullock | H04L 67/53 |
| 2019/0027147 | A1* | 1/2019 | Diamant | G10L 15/22 |
| 2019/0080708 | A1* | 3/2019 | Mohan | G10L 15/22 |
| 2019/0115011 | A1* | 4/2019 | Khellah | G10L 15/02 |
| 2019/0147222 | A1* | 5/2019 | Gao | G10L 15/22 382/116 |
| 2019/0180343 | A1* | 6/2019 | Arnett | G06Q 30/0633 |
| 2019/0251622 | A1* | 8/2019 | Wiedmeyer | G06Q 30/0623 |
| 2019/0278797 | A1* | 9/2019 | Joshi | G06T 11/00 |
| 2019/0348037 | A1* | 11/2019 | Khullar | G10L 15/26 |

FOREIGN PATENT DOCUMENTS

| | | |
|---|---|---|
| CN | 106897372 A | 6/2017 |
| KR | 10-1134615 B1 | 4/2012 |
| KR | 10-2014-0065214 A | 5/2014 |
| KR | 10-1449862 B1 | 10/2014 |
| KR | 10-2015-0056160 A | 5/2015 |
| KR | 10-1592981 B1 | 2/2016 |
| KR | 10-1597102 B1 | 2/2016 |
| KR | 10-2016-0027849 A | 3/2016 |
| KR | 10-2016-0116752 A | 10/2016 |
| WO | 2015/142719 A2 | 9/2015 |

OTHER PUBLICATIONS

Written Opinion (PCT/ISA/237) dated Apr. 12, 2019 issued by the International Searching Authority in International Application No. PCT/KR2019/000477.
Communication dated Nov. 2, 2020, issued by the European Patent Office in counterpart European Application No. 19744176.9.
Communication dated May 4, 2022, issued by the European Patent Office in counterpart European Application No. 19744176.9.
Communication dated Oct. 20, 2022 issued by the Intellectual Property Office of the Korean Patent Office in application No. 10-2018-0009965.
Office Action dated Feb. 23, 2023 by the Chinese Patent Office for Chinese Patent Application No. 201980010152.0.

* cited by examiner

FIG. 11
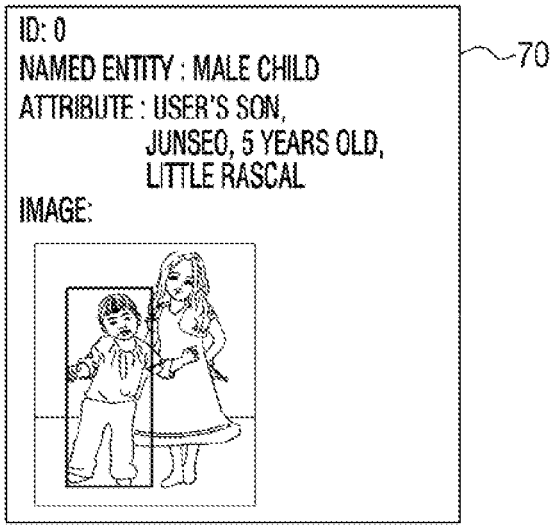
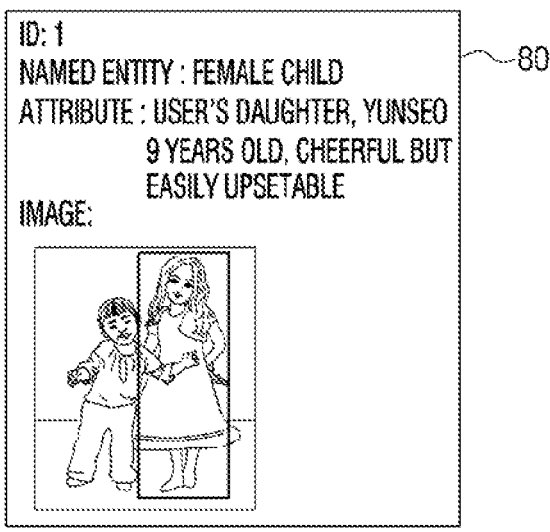
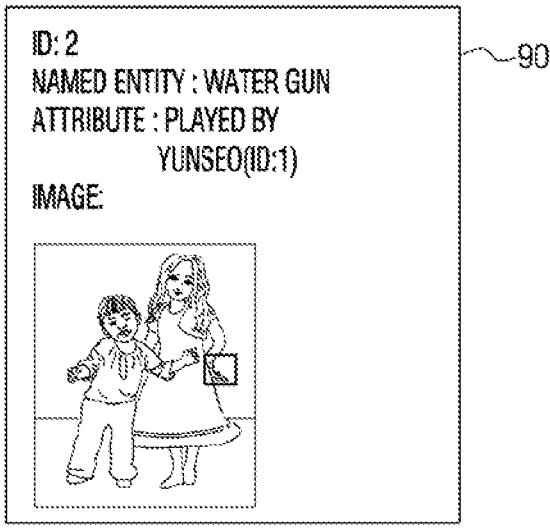

ELECTRONIC APPARATUS AND CONTROL METHOD THEREOF

TECHNICAL FIELD

This disclosure relates to an electronic apparatus and a control method thereof and, more particularly, to an electronic apparatus capable of generating tag information based on a user voice and a control method thereof.

BACKGROUND ART

In recent years, artificial intelligence (AI) systems have been used in various fields. An AI system is a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology is composed of machine learning, for example deep learning, and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, voice recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

For efficient management of information and various user experiences, electronic apparatuses have provided a function to generate tag information for an image. Tag information is data for an image and a kind of metadata.

As for the related-art tag information generation method, it is general that the tag information is generated uniformly only with information that may be identified in the same manner by anyone from an image, and a unique thinking, feeling, or the like, of a user associated with an image is not reflected as tag information.

DISCLOSURE

Technical Problem

The disclosure provides an electronic apparatus capable of generating tag information based on a user voice and a control method thereof.

Technical Solution

According to an embodiment, a control method of an electronic apparatus includes displaying an image including at least one object, receiving a voice, identifying an object associated with the voice among at least one object included in the image, by inputting the voice to an artificial intelligent (AI) model trained by an AI algorithm and obtaining tag information for the identified object, and providing the obtained tag information.

According to an embodiment, an electronic apparatus includes a display, a microphone, a memory configured to store computer executable instructions, and a processor configured to a processor configured to execute the computer executable instructions to control the display to display an image including at least one object, identify an object associated with the voice among at least one object included in the voice by inputting the voice received through the microphone to the AI model trained by the AI algorithm, obtain tag information for the identified object, and provide the obtained tag information.

DESCRIPTION OF DRAWINGS

FIG. 11 is a diagram illustrating tag information according to an embodiment;

DETAILED DESCRIPTION OF EXEMPLARY EMBODIMENTS

Figure 1:
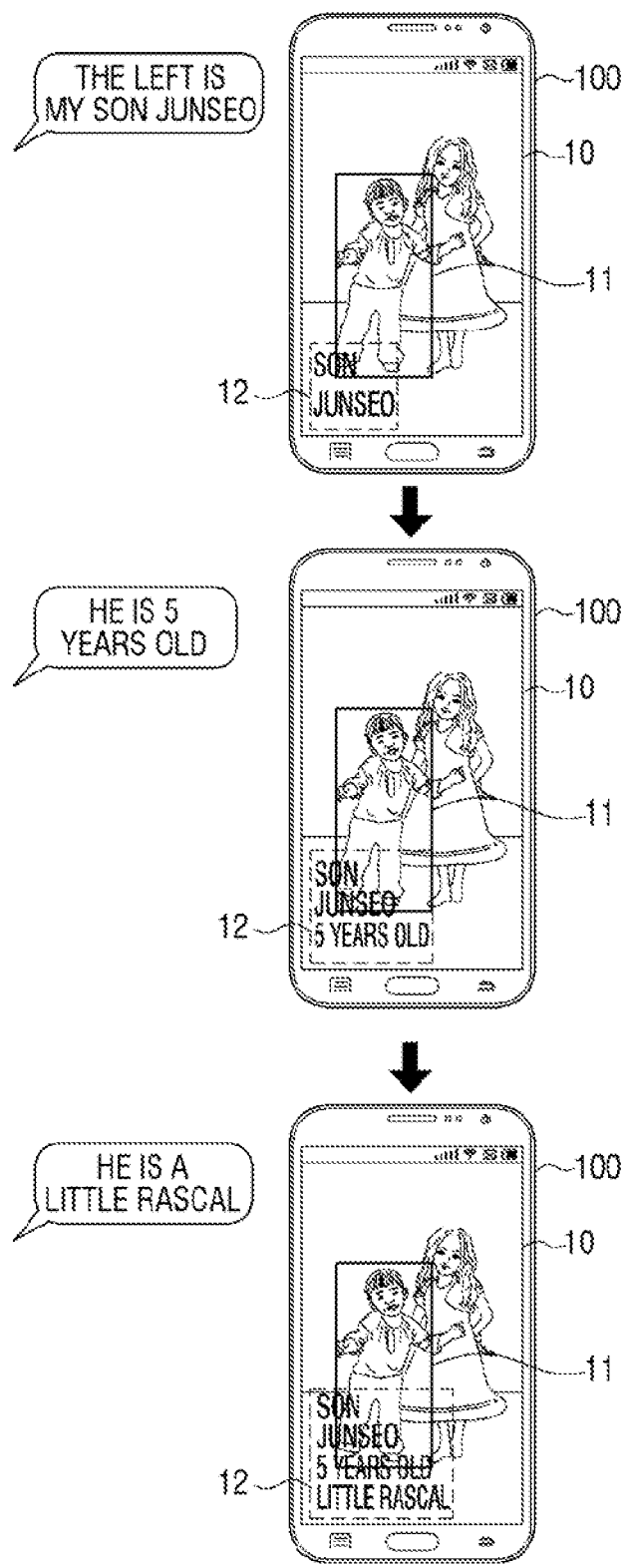
FIG. 1 is a use diagram of an electronic apparatus to generate tag information based on a voice according to an embodiment.

Hereinafter, embodiments of the disclosure will be described with reference to the accompanying drawings.

However, it should be understood that the disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In this specification, the expressions "have," "may have," "include," or "may include" or the like represent presence of a corresponding feature (for example: components such as numbers, functions, operations, or parts) and does not exclude the presence of additional feature.

In the description, the term "A or B". "at least one of A or/and B", or "one or more of A or/and B" may include all possible combinations of the items that are enumerated together. For example, the term "at least one of A or/and B" means (1) including at least one A, (2) including at least one B, or (3) including both at least one A and at least one B.

As used herein, the terms "first," "second," or the like may denote various components, regardless of order and/or importance, and may be used to distinguish one component from another, and does not limit the components. For example, a first user device and a second user device may indicate different user devices regardless of a sequence or importance thereof. For example, the first component may be named the second component and the second component may also be similarly named the first component, without departing from the scope of the disclosure.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element. On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The electronic apparatus according to various embodiments may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, or a wearable device. According to various embodiments, the wearable device may be of the type of accessory (e.g., a watch, a ring, a bracelet, a bracelet, a necklace, glasses, a contact lens or a head-mounted-device (HMD)), a fabric or clothing (e.g., an electronic garment), a body attachment (e.g., a skin pad or tattoo), or a bio-implantable (e.g., implantable circuit).

In another embodiment, the electronic apparatus may be a home appliance. Home appliances may include at least one of, for example, televisions (TVs), digital video disc (DVD) players, audio, refrigerators, air-conditioners, vacuum cleaners, ovens, microwaves, washing machines, air cleaners, set-top box, home automation control panel, a security control panel, a TV box such as Samsung HomeSync™, Apple TV™ or Google TV™), a game console (e.g., Xbox™, PlayStation™), an e-dictionary, an electronic key, a camcorder, or an electronic photo frame.

In another embodiment, the electronic apparatus may include at least one of a variety of medical devices such as various portable medical measurement devices (a blood glucose meter, a heart rate meter, a blood pressure meter or a temperature measuring device, a magnetic resonance angiography (MRA), a magnetic resonance imaging (MRI), computed tomography (CT), a photographing device, or an ultrasonic device, etc.), a navigator, global navigation satellite system (GNSS), an event data recorder (EDR), a flight data recorder (FDR), automotive infotainment devices, marine electronic equipment (e.g., marine navigation devices, gyro compasses, etc.), avionics, security devices, head units for the vehicle, industrial or home robots, automatic teller's machine (ATM), point of sales (POS) of a store, or internet of things (e.g., light bulbs, various sensors, electricity or gas meters, sprinkler devices, fire alarms, thermostats, street lights, a toaster, a fitness equipment, a hot water tank, a heater, a boiler, etc.).

In another embodiment, the electronic apparatus may include at least one of a piece of furniture or a part of a building/structure, an electronic board, an electronic signature receiving device, a projector, or various measuring devices (e.g., water, electricity, gas, or radio wave measuring instruments, etc.). In various embodiments, the electronic apparatus may be a combination of one or more of the various devices described above. The electronic apparatus according to some embodiments may be a flexible electronic apparatus. Further, the electronic apparatus according to the embodiment of the disclosure is not limited to the above-described devices, and may include a new electronic apparatus according to technological advancement.

The disclosure relates to an art for tagging information in an image, and more particularly, to generating tag information for an object included in an image more easily based on a voice (or speech). Tag information refers to data for image as a kind of metadata.

FIG. 1 is a use diagram of an electronic apparatus 100 to tag information to an image according to an embodiment.

Referring to FIG. 1, the electronic apparatus 100 may display an image 10 that includes at least one object, and information included in the user voice may be tagged to the object included in the image 10. Here, the object may be any of a person, an object, or the like, which is present in a distinguishable manner from others. The object may be referred to as an entity.

The user may give a voice describing about the image 10 while the image 10 is being displayed in the electronic apparatus 100. The user voice describing the image 10 may be input through a microphone provided in the electronic apparatus 100. Alternatively, the user voice may be input through an external microphone electrically connected to the electronic apparatus 100.

An object associated with a voice of the objects included in the image 10, that is, a target object to be tagged with information, may be identified. The voice may include at least one description for identifying a target object to be tagged with information. For example, the voice may include at least one of a description of an appearance of the target object, a description of a gender of the target object, a description of a color of the target object, a description of a position of the target object, a description of a category of the target object, a description of a name of the target object, or the like. According to an embodiment, the target object in an image may be identified by inputting a voice and an image to an artificial intelligence (AI) model trained by an AI algorithm.

In an example of FIG. 1, the target object 11 may be identified in the image 10 based on a voice that "the left is my son, Junseo."

When an object related to a voice is identified, the electronic apparatus 100 may display a user interface (UI) element notifying that the identified object is the target object to be tagged. For example, as illustrated in FIG. 1, the electronic apparatus 100 may display a rectangular UI element surrounding the target object 11 to be tagged.

Tag information 12 for the target object 11 may be obtained based on the voice. In FIG. 1, the words included in the voice, "son" and "Junseo", are tagged to the target object 11. According to an embodiment, a voice is input to an AI model trained by an AI algorithm to obtain a keyword from the voice, and the obtained keyword may be tagged to the target object. The electronic apparatus 100 may display the tagged keywords with the image 10.

The keyword of the input user voice subsequently input may be additionally tagged to the target object 11. Referring to the embodiment of FIG. 1, "5 years" and "little rascal" are additionally tagged. The tag information 12 may be displayed with the image 10. As illustrated in FIG. 1, a keyword of the voice subsequently input is added as the tag information and may be displayed together with the keyword previously displayed.

Figure 2:
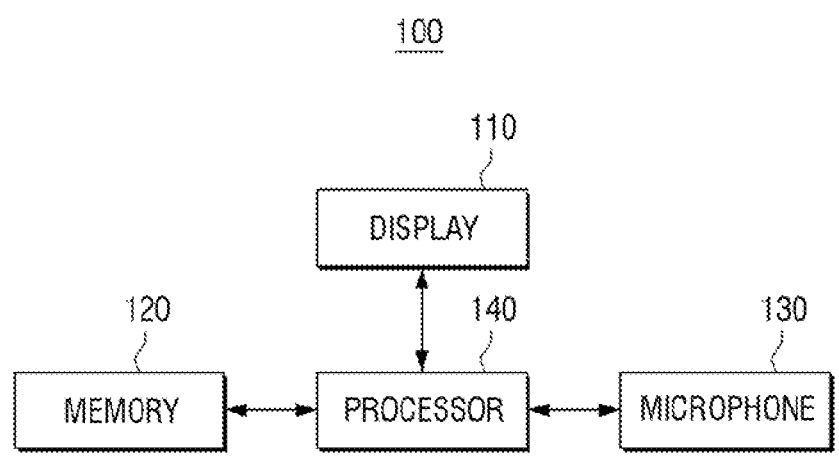
FIG. 2 is a block diagram illustrating a configuration of an electronic apparatus according to an embodiment.

FIG. 2 is a block diagram illustrating a configuration of the electronic apparatus 100 according to an embodiment.

Referring to FIG. 2, the electronic apparatus 100 includes a display 110, a memory 120, a microphone 130, and a processor 140. According to an implementation type, some configurations may be omitted, and some hardware/software configurations which are not illustrated but are obvious to those skilled in the art may be additionally included in the electronic apparatus 100.

The display 110 may include, for example, a liquid crystal display (LCD), light-emitting diode (LED) display, an organic light-emitting diode (OLED), a display (for example, active-matrix organic light-emitting diode (AMO-LED), passive-matrix OLED (PMOLED)), or a microelectromechanical systems (MEMS) display, or an electronic paper display.

The display 110 may display various images, for example, images including texts, images, videos, icons, or symbols.

According to an embodiment, the display 110 may include a touch screen and may receive a touch, a gesture, proximity, or hovering input using, for example, an electronic pen or a part of the user's body.

The memory 120 may, for example, include an embedded memory or an external memory. The embedded memory may, for example, include at least one of a volatile memory (e.g. dynamic random access memory (DRAM)), a static RAM, a synchronous dynamic RAM (SDRAM), a non-volatile memory (e.g. one time programmable read only memory (OTPROM)), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, and a solid state drive (SSD).

The external memory may further include a flash drive, such as a compact flash (CF), a secure digital (SD), a micro secure digital (Micro-SD), a mini secure digital (Mini-SD), an extreme digital (xD), a multi-media card (MMC), or a memory stick. The external memory may be connected to the electronic apparatus 100 functionally and/or physically through various interfaces.

The memory 120 is accessed by the processor 140, and read/write/modify/delete/update of data by the processor 140 may be performed. The term memory in this document refers to the memory 120 (not shown), a ROM in the processor 140, a RAM, or a memory card (for example, a micro SD card and a memory stick) provided on the electronic apparatus 100. The memory 120 may store computer executable instructions. In the memory 120, a program, data, or the like, for configuring various screens to be displayed in a display region of the display 110 may be stored.

According to an embodiment, the memory 120 may be implemented with not only a storage medium inside the electronic apparatus 100 but also a web server, or the like, through network.

The microphone 130 is a structure for receiving sound. The microphone 130 may convert the received sound into an electrical signal. The microphone 130 may be implemented integrally with or separated from the electronic apparatus 100. The separated microphone 130 may be electrically connected to the electronic apparatus 100.

The processor 140 is a configuration for controlling the overall operation of the electronic apparatus 100. The processor 140 may be implemented, for example, as a central processing unit (CPU), an application specific integrated circuit (ASIC), a system on chip (SoC), a MICOM, or the like. The processor 140 may operate an operating system or an application program to control a plurality of hardware or software components connected to the processor 140, and may perform various data processing and operations. According to one embodiment, the processor 140 may further include a graphics processing unit (GPU) and/or an image signal processor. The processor 140 may execute the computer executable instructions to perform the functions according to various embodiments of the disclosure.

The processor 140 may perform various operations in association with the display 110, the memory 120, and the microphone 130, by executing a computer-executable instruction stored in the memory 120.

For example, the processor 140 may control the display 110 to display an image including at least one object. The processor 140 may identify an object related to a voice among at least one object included in an image displayed in the display 110 and generate tag information for the identified object, by inputting a user voice received through the microphone 130 to a model trained by the AI algorithm. The processor 140 may provide the generated tag information.

For example, referring to FIG. 1, when user voice is input through the microphone 130 of the electronic apparatus 100 while the image 10 is displayed through the display 110 of the electronic apparatus 100, the processor 140 may input voice to the AI model trained by the AI algorithm to identify the object 11 associated with the voice, generate tag information 12 for the object, and provide the tag information 12 via the display 110.

The AI model trained by the AI algorithm may be stored in the memory 120. The AI model trained by the AI algorithm may be stored in a server external to the electronic apparatus 100 so that when the electronic apparatus 100 transmits the image and user voice (voice data) to the server, the external server may identify the object related to the voice in the image and transmit the result to the electronic apparatus 100.

According to an embodiment, a content of the voice of the user from a point designated by the user may be tagged to an object in the image. That is, the tagging function of the electronic apparatus 100 may be initiated at a point of time desired by the user. A variety of ways may be used to initiate the tagging function.

Figure 3:
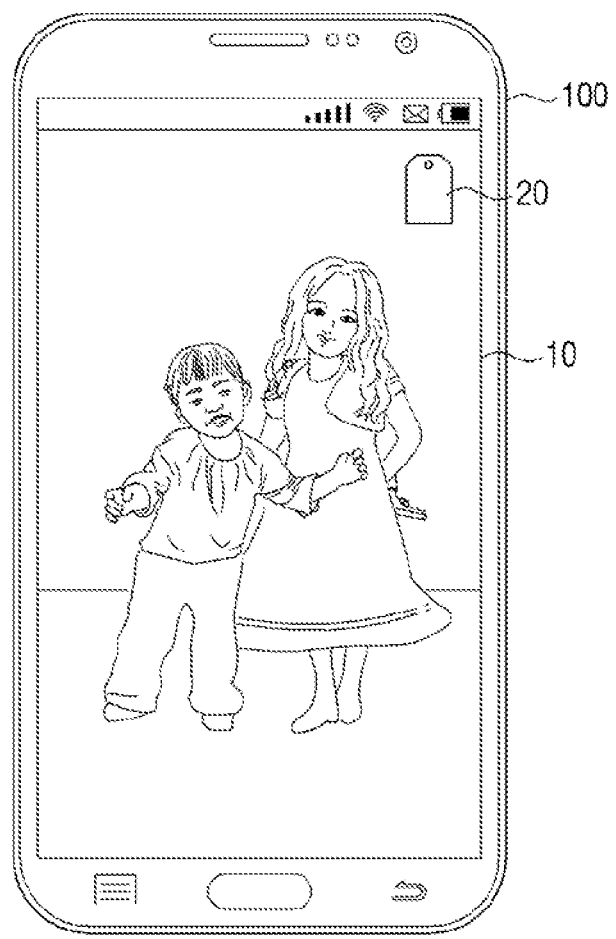
FIG. 3 is a view illustrating various embodiments related to executing a tagging function by an electronic apparatus.
Figure 4:
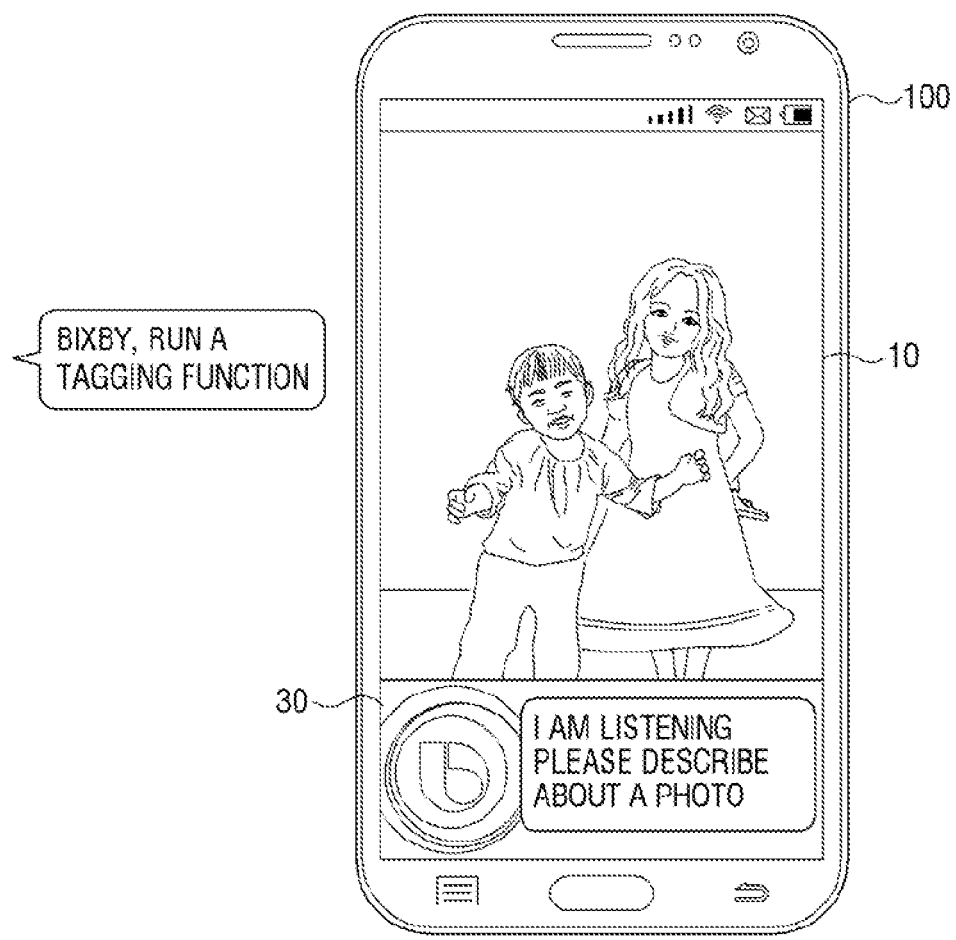
FIG. 4 is a view illustrating various embodiments related to executing a tagging function by an electronic apparatus.

FIGS. 3 and 4 are views illustrating various embodiments related to executing a tagging function.

Referring to FIG. 3, the electronic apparatus 100 according to one embodiment of may provide a UI element 20 for initiating a tagging function for the image 10, and may initiate a tagging function when the UI element 20 is selected. A tagging operation may be performed based on the input voice after the tagging function is initiated. The UI element 20 may be selected via a variety of input methods. For example, if the electronic apparatus 100 is an apparatus including a touch screen, the user may initiate the tagging function by touching the UI element 20.

FIG. 4 is a view illustrating various embodiments related to executing a tagging function based on voice recognition.

The electronic apparatus 100 may include an AI agent for providing a voice recognition server. The AI agent is a dedicated program for providing AI-based service (for example, voice recognition service, assistant service, translation service, search service, or the like), and may be executed by an existing general-purpose processor or a separate AI-dedicated processor.

For example, a tagging function may be initiated when a user utters a word (e.g., a "Bixby") to initiate a voice recognition function and utters a voice (e.g., "Execute a tagging function") requesting a tagging function, a tagging function may be initiated. In this example, a UI 30 indicating that the tagging function for the image 10 has been initiated may be displayed. For example, as shown in FIG. 4, the UI 30 may include a guide phrase that guides a user to speak information to be tagged to an object in the image 10. After the tagging function is initiated by the voice, a tagging operation may be performed based on the input voice.

As described above, according to an embodiment in which a tagging operation is performed based on the voice that is input after the tagging function is initiated, there is an effect that only the words desired by a user may be tagged to an image.

According to an embodiment, a tag may be deleted during tagging via voice. For example, a UI element to delete a keyword of the voice included in the tag information may be displayed. This will be described with reference to FIG. 5.

Figure 5:
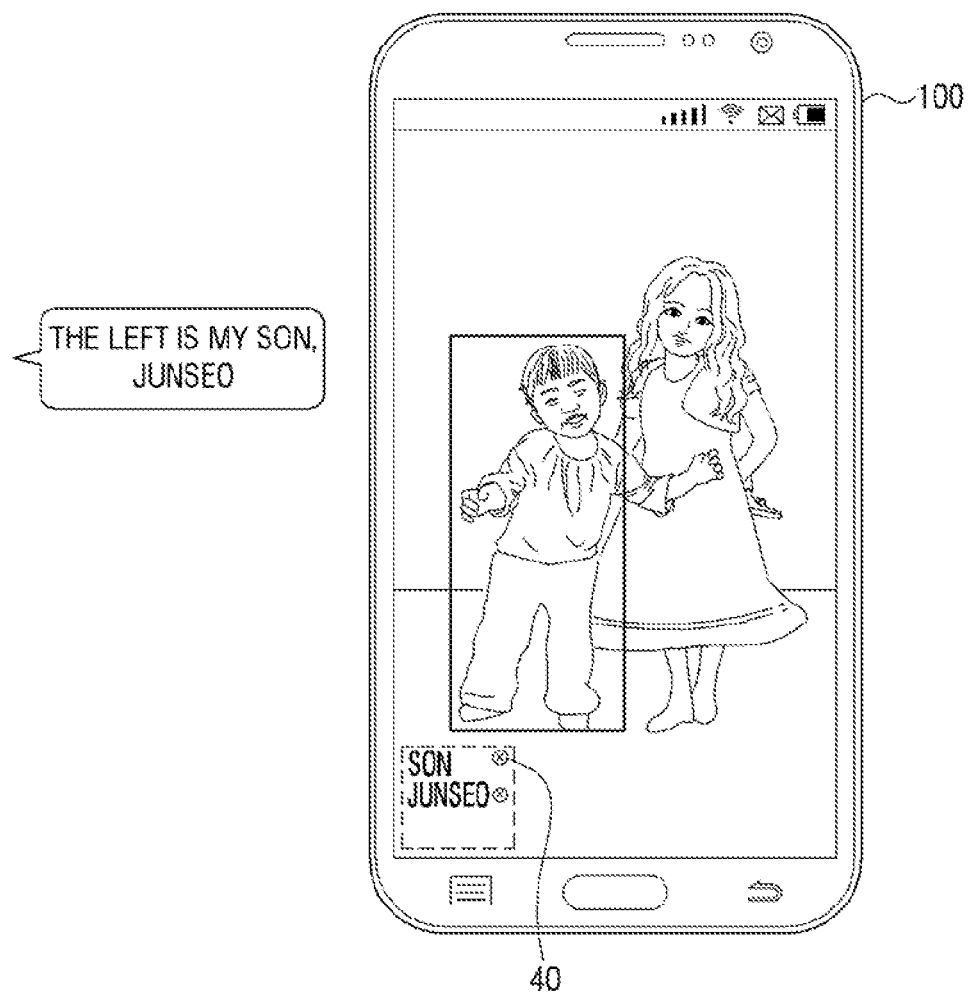
FIG. 5 is a diagram illustrating an embodiment of deleting tag information.

Referring to FIG. 5, the electronic apparatus 100 may provide a UI element 40 for deleting by tagged words. When the user selects the UI element 40, the tag may be deleted. For example, when the UI element 40 displayed beside "son" is selected, the "son" may be deleted from the tag information.

According to another embodiment, it is possible to modify and edit tagged words. For example, if the electronic apparatus 100 has a touch screen, if the user touches, for example, "son" among the tag information displayed on the touch screen, "son" may be in a modifiable state. A cursor and a soft keyboard may be displayed in a modifiable state, and the user may modify the content using a soft keyboard. It is possible to modify, delete, and also enter a new tag content through the soft keyboard.

According to the embodiments described above, the content a user does not want to be tagged during speaking may be excluded, and there is an effect that even if voice is not correctly recognized, a tag may be modified.

Figure 6:
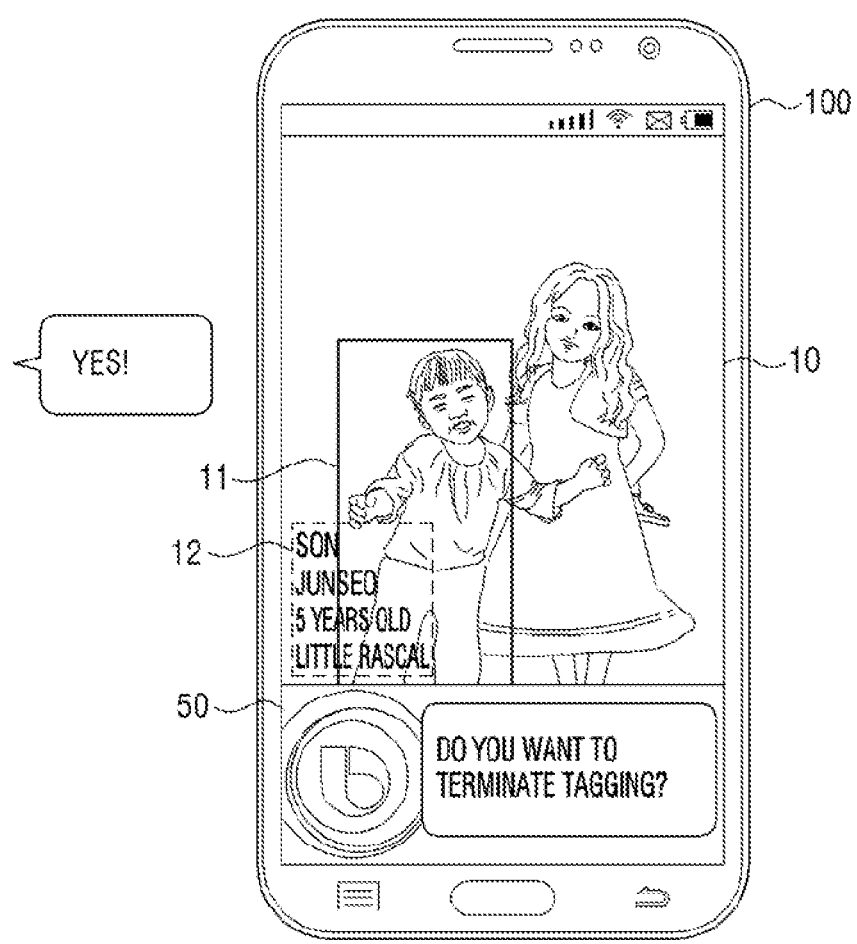
FIG. 6 is a diagram illustrating an embodiment associated with terminating a tagging function by an electronic apparatus.

When tagging is terminated, the user may terminate a tagging function. According to the disclosure, the tagging function may be terminated by various methods. FIG. 6 illustrates an embodiment of terminating the tagging function.

Referring to FIG. 6, the electronic apparatus 100 may provide a UI 50 asking whether to terminate the tagging. For example, the electronic apparatus 100 may determine that the user is intended to finish the tagging and display a UI 50 if the user voice is not entered for a predetermined period of time during tagging. In response to the displayed UI 50, if the user speaks a consented voice, such as, for example, "Yes," the electronic apparatus 100 may recognize this and terminate the tagging function. The electronic apparatus 100 may match the object 11 in the image 10 with the tag information 12 and store the same in the memory 120.

The tagging function may be terminated in a variety of ways. According to another embodiment, when a user speaks a voice intended for terminating tagging, such as "describing a photo ended", "the electronic apparatus 100 may recognize it and terminate the tagging function. According to another embodiment, the electronic apparatus 100 may display an icon for terminating the tagging function along with the image 10 and may terminate the tagging function if the icon is selected.

According to an embodiment, if there are a plurality of objects with which the user wishes to tag information in an image, the user may distinguish the objects for tagging. For example, if a plurality of objects associated with a voice input from an image are identified, the electronic apparatus 100 may obtain tagging information for each of the plurality of objects based on the input voice. This embodiment will be described with reference to FIG. 7.

Figure 7:
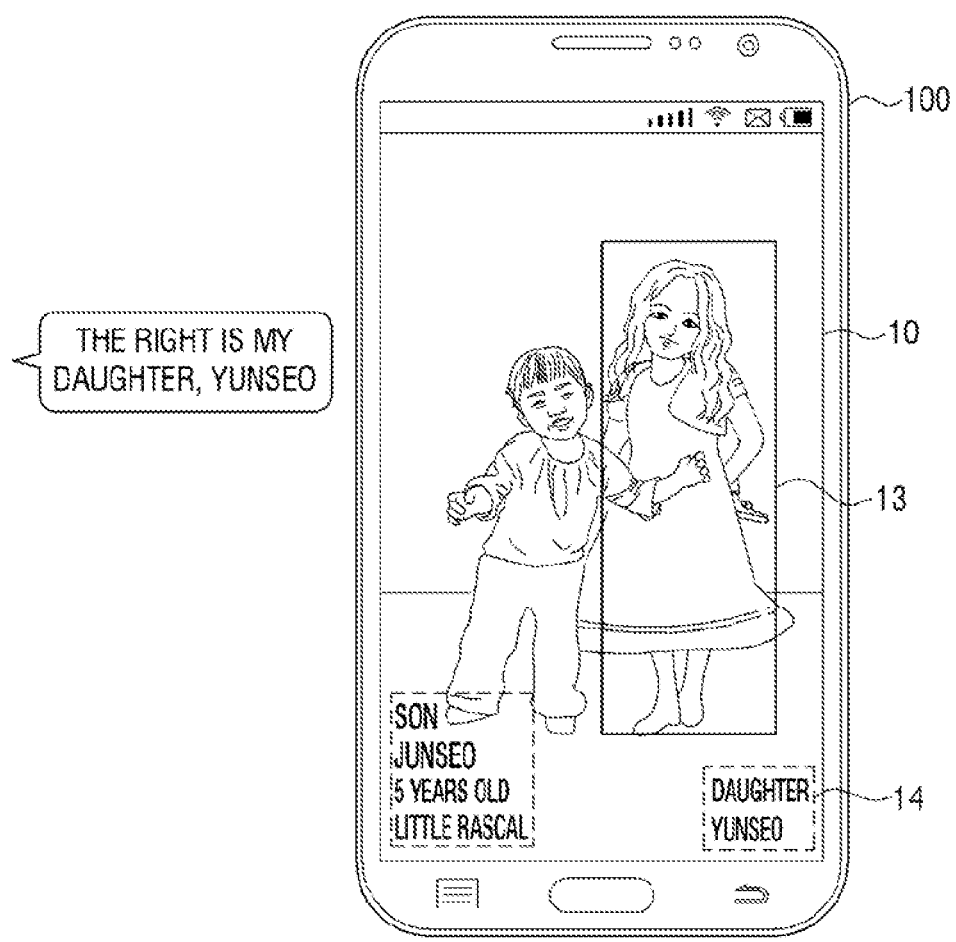
FIG. 7 is a diagram illustrating an embodiment associated with generating tag information for each of a plurality of objects in an image.

FIG. 7 is a diagram illustrating an embodiment of tagging information to a plurality of objects according to an embodiment.

Referring to FIG. 7, when tagging for Junseo is completed, the user may perform tagging for Yunseo in the image 10.

The electronic apparatus 100 may identify an object corresponding to a trigger voice when the trigger voice for object conversion is input while tagging for the first object in the image 10 is performed, and perform new tagging on the identified object. The trigger voice may include, for example, at least one of a description of the appearance of the target object, a description of the gender of the target object, a description of the color of the target object, a description of the position of the target object, a description of the category of the target object, a description of the name of the target object, or the like. As illustrated in FIG. 7, a description of the position of an object, such as "right", may be a trigger voice to switch the object to be tagged.

The electronic apparatus 100 may display a UI element indicating that the new object is to be tagged if a new object 13 is identified by inputting a trigger voice for object conversion. For example, as shown in FIG. 7, a rectangular UI element surrounding the identified object 13 may be displayed. When the new object 13 is identified and user voice is input, tag information 14 for the new object 13 may be generated based on the input voice.

According to the embodiment, while the user speaks naturally, tag information for each of several objects in the image may be generated.

Figure 8:
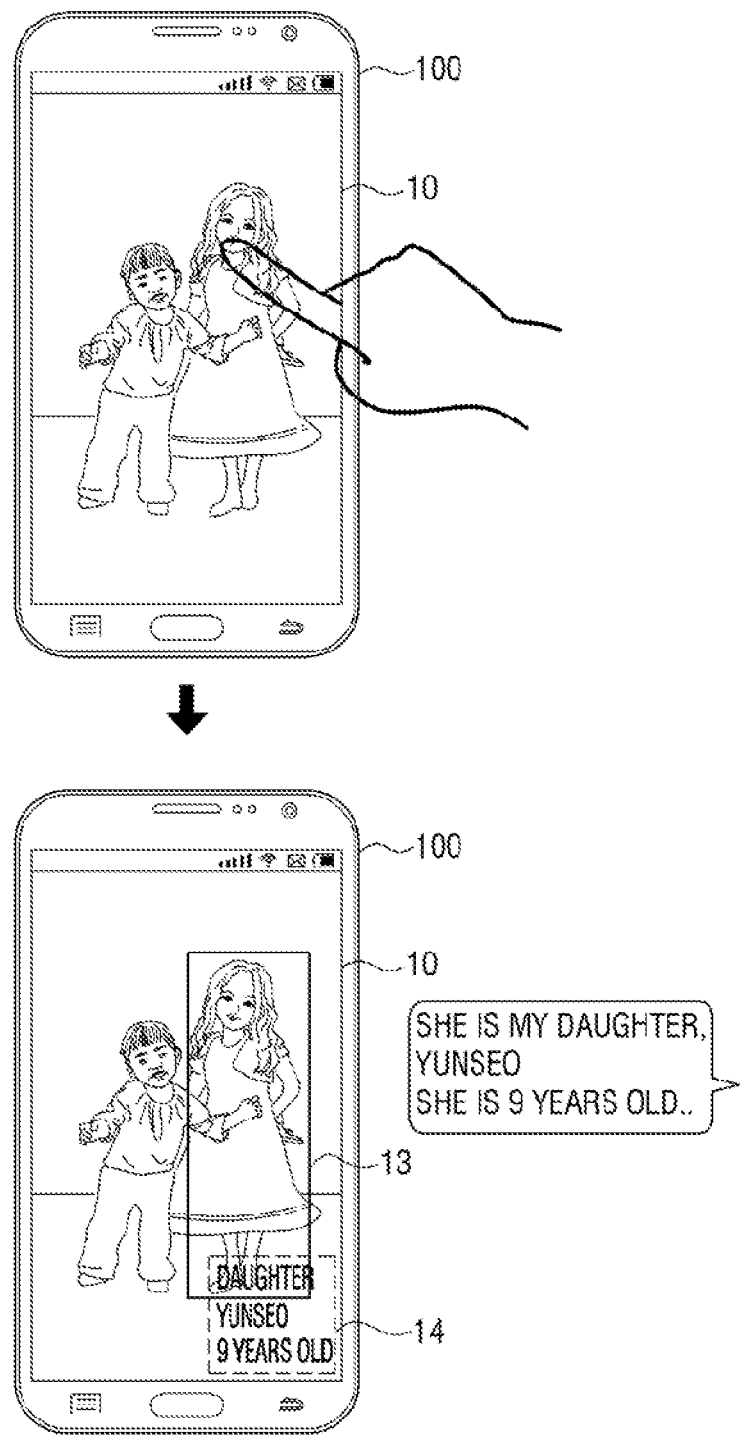
FIG. 8 is a diagram illustrating a method for identifying a target object to be tagged in an image according to an embodiment.

Identifying the target object for tagging based on the voice is described in the embodiments above, but according to still another embodiment, the target object may be identified by a user manipulation. FIG. 8 illustrates the embodiment.

Referring to FIG. 8, when the electronic apparatus 100 has a touch screen, when a user touch with respect to the displayed image 10 is detected through the touch screen, the electronic apparatus 100 may identify an object located where the touch is detected as a target object for tagging. When the target object for tagging is identified and the user voice is input, tag information 14 for the target object 13 for tagging may be generated based on the input voice.

Identifying an object based on user manipulation, as described above, may be used as an auxiliary means when identification of an object based on voice is not successfully performed. For example, the electronic apparatus 100 may display a guide UI, such as "please touch an object to be tagged", if the electronic apparatus 100 fails to identify the object based on voice.

According to an embodiment, tag information may be obtained with reference to pre-generated tag information. For example, the electronic apparatus 100 may identify the first object associated with a voice in an image and obtain the tag information for the first object with reference to the pre-generated tag information for a second object included in the image. An embodiment of the present invention will be described with reference to FIGS. 9 to 10.

Figure 9:
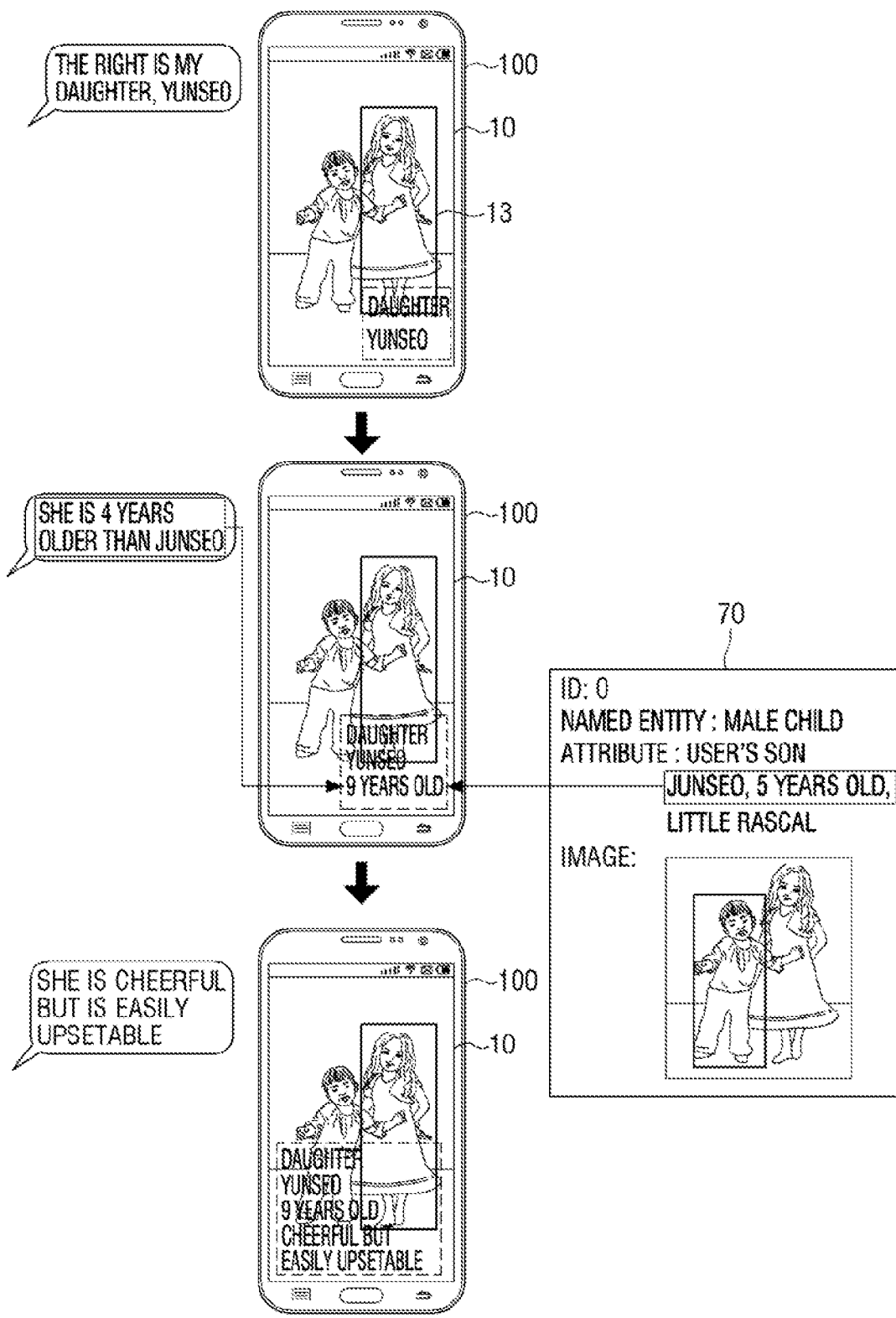
FIG. 9 is a diagram illustrating various embodiments associated with generating new tag information with reference to pre-generated tag information.

Referring to FIG. 9, if pre-generated tag information 70 exists for the first object 11 among the objects in the image 10, the pre-generated tag information 70 may be referred to, when the tag information for the second object 13 is generated based on the user voice. The tag information 70 may be stored in the memory 120.

As shown in FIG. 9, when a user voice of "older than Junseo by four years" is input, the electronic apparatus 100 may input the voice and tag information 70 to a trained AI model using an AI algorithm to obtain information from the pre-generated tag information 70 that Junseo is five years old and the target object 13 to be tagged is four years older than Junseo, and thus may tag "nine years" to a target object 13 for tagging based on the obtained information.

Figure 10:
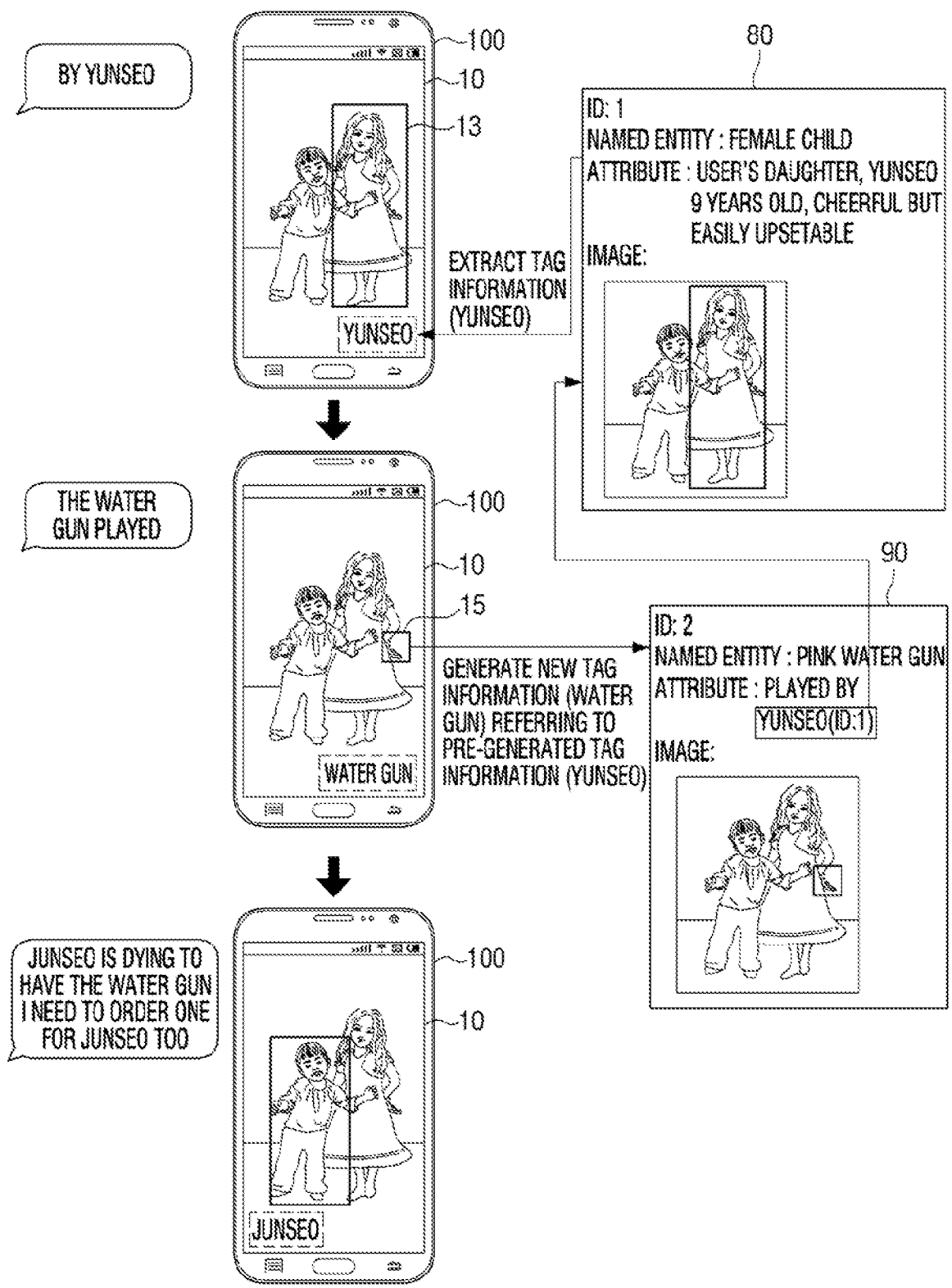
FIG. 10 is a diagram illustrating various embodiments associated with generating new tag information with reference to pre-generated tag information.

FIG. 10 is a diagram illustrating another embodiment associated with generating new tag information with reference to pre-generated tag information.

Referring to FIG. 10, when there is the pre-generated tag information 80 for the first object 13 among the objects inside the image 10, the pre-generated tag information 80 may be referred to, when the tag information for a second object 15 is generated based on the user voice.

As illustrated in FIG. 10, when the user voice, "that water gun Yunseo is playing with," the electronic apparatus 100 may extract tag information 80 including "Yunseo" among the pre-generated tag information and generate new tag information 80 including the extracted tag information 80.

The generated tag information may be used in various ways. For example, when a user utters a voice including an intention to purchase a specific object, the electronic apparatus 100 may display a web page for purchasing the object by referring to tag information corresponding to the object. For example, in the example of FIG. 10, when the user utters a voice saying, "Junseo is dying to have the water gun Yunseo is playing with. I need to order one for Junseo too," the electronic apparatus 100 may refer to a named entity from the tag information 90 generated for the water gun and display a website that sells a pink water gun by referring to the named entity.

According to an embodiment, the electronic apparatus 100 may input an image to a first AI model to obtain information on at least one object in the image, and identify an object related to the voice among the obtained at least one object based on information on the at least one object and a word included in the voice. The voice may be input to a second AI model to obtain tag information including a keyword of the voice.

The tag information may include tag information obtained by analyzing an image as well as tag information obtained based on the voice. That is, for example, the tag information may include information about the identified object among information about at least one object obtained by inputting the image to the first AI model as well as the keyword of the obtained voice by inputting the voice to the second artificial intelligence model. The first AI model may be a model for visual understanding, and the second AI model may be a model for linguistic understanding.

FIG. 11 is a diagram illustrating tag information according to an embodiment.

The tag information for the object in the image may include information about the object obtained by analyzing the image. Referring to FIG. 11, a "named entity" item is information obtained through image analysis. Various conventional image analysis techniques may be used to obtain information about an object. For example, an AI model may be used to analyze an image to recognize a category of an object (human animal, thing, landscape, etc.), and it is possible to recognize an appearance, color, gender, age, face, or the like, of the object. Through such image analysis, information on the object may be obtained and included in the tag information.

The tag information may include information on an object obtained by inputting the voice input from the user to the AI model. Referring to FIG. 11, "attribute" item refers to information obtained through the voice.

The information obtained through the voice is reflected with a user's unique thinking, feeling, or the like, and has a property as more personalized information as compared to the information obtained through image analysis. According to an embodiment, tag information may be generated by including information obtained through image analysis and information obtained through voice, so that more various kinds of tag information may be utilized.

The tag information includes an image in which the target object for tagging is identified. Referring to FIG. 11, "image" item is an image in which the object to be tagged is identified.

The tag information 70, 80, and 90 generated as shown above may be stored in the memory 120. The generated tag information 70 and 80 may be stored in an external server and shared with other users.

Figure 12:
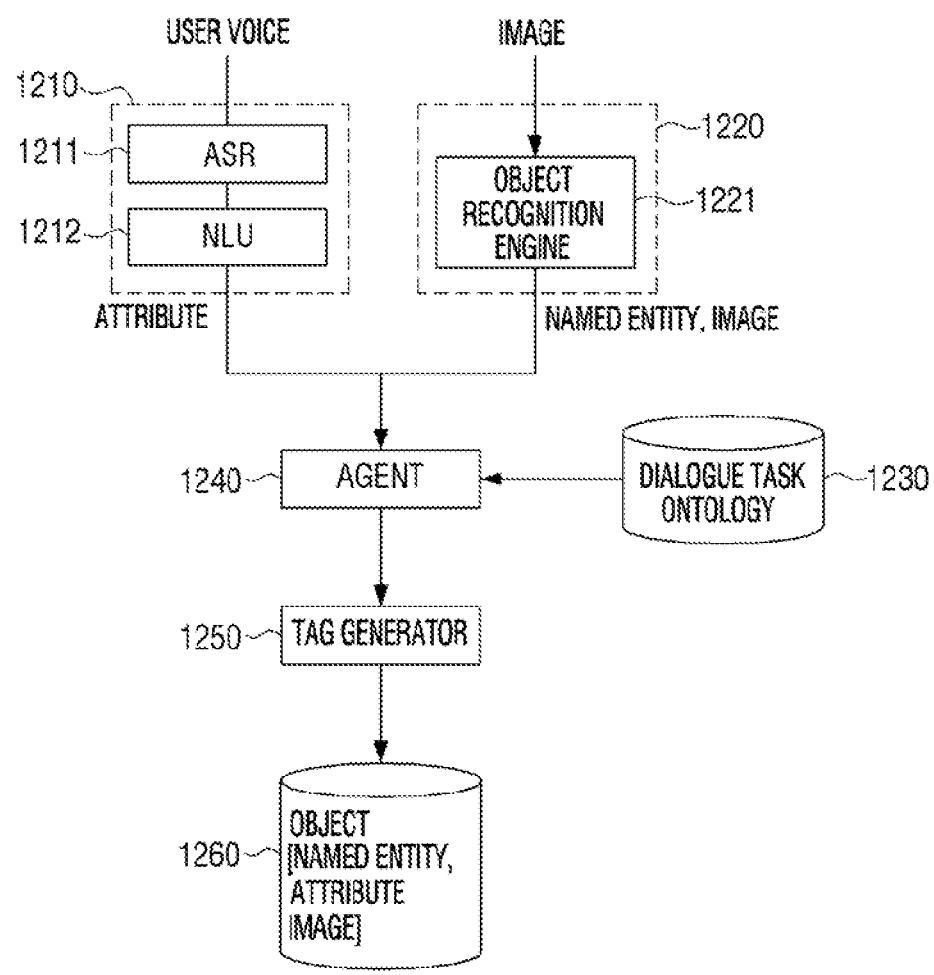
FIG. 12 is a diagram illustrating tag information generating method according to an embodiment.

FIG. 12 is a diagram illustrating tag information generating according to an embodiment.

Referring to FIG. 12, a user voice is input to a voice engine 1210, and an image including at least one object is input to an image engine 1220. The voice engine 1210 may perform processing on the input voice using a model for linguistic understanding trained using an AI algorithm. The image engine 1220 may perform processing on the image using a model for visual understanding trained by using an AI algorithm.

A voice input to an automatic voice recognition module (ASR) 1211 is converted to a plain text. A natural linguistic understanding (NLU) module 1212 receiving the converted text may perform several analyses for making the system understand the converted text.

Based on the converted text using the ASR module 1211, the NLU module 1212 may perform a natural linguistic understanding process to grasp the intention of the user utterance. In the natural linguistic understanding process, morpheme analysis, syntactic analysis, dialogue act, main action, keyword analysis, or the like, may be performed. Specifically, the NLU module 1212 may perform a morpheme analysis to divide a text into a unit of a morpheme that is the smallest semantic unit to analyze which word class each morpheme has. By the morpheme analysis, information of a word class such as noun, verb, adjective, postposition, or the like, may be identified. The NLU module 1212 may perform syntactic analysis processing. The syntactic analysis is performed by dividing a user's utterance with a specific reference, such as a noun phrase, a verb phrase, an adjective phrase, etc., and analyzing whether there is any relationship between each divided chunk. Through this syntactic analysis, subject, object, qualifiers of the user utterance may be grasped.

Keywords of the voice obtained as a result of analyzing the voice from the NLU module 1212 may be included as "attribute" item from tag information.

The image engine 1220 includes an object recognition engine 1221, and the object recognition engine 1221 may identify which things appear in the image. For example, the image engine 1220 may use the feature vector technique to identify what the object is. The feature vector technique is a technique in which various features of an object, such as color, shape, movement, etc., are combined to recognize what is the object. For example, if an image including a male child is input, the object recognition engine may define a male child through recognition of physique, ratio, facial feature, or the like, of the object.

The object recognition engine 1221 may provide information (for example, "male child") on the object as a result of processing an image and this may be included in the tag information as the "named entity" item.

An agent 1240 may be an AI agent. The AI agent is a dedicated program for providing an AI-based service (e.g., a voice recognition service, an assistant service, a translation service, a search service, etc.), and may be executed by an existing general purpose processor (e.g., a central processing unit (CPU)) or a separate AI-only processor (e.g., graphics processing unit (GPU), etc.). The agent 1240 may be mounted on the electronic apparatus 100 or mounted on the external server of the electronic apparatus 100.

For an entity (for example, what is "that", call "that person") among the user utterance which is not understandable, the agent 1240 may distinguish by utilizing a dialogue task ontology 1230.

A tag generator 1250 may generate tag information based on information obtained through the voice engine 1210 and the image engine 1220 and store the information in database 1260.

In the above-described embodiment, at least one of the voice engine 1210, the object recognition engine 1220, the agent 1240, the dialogue task ontology 1230, and the tag generator 1250 may be implemented as a software module or in a form of at least one hardware chip and mounted to the electronic apparatus 100, or may be alternatively mounted on an external server of the electronic apparatus 100. When the voice engine 1210, the object recognition engine 1220, and the agent 1240 are implemented in a software module (or a program module including an instruction), the software module may be stored in a computer readable non-transitory computer readable media. In this example, the software module may be provided by an operating system (OS), or provided by a predetermined application. Alternatively, some of the software modules may be provided by the OS, and some of which may be provided by predetermined applications.

Figure 13A:
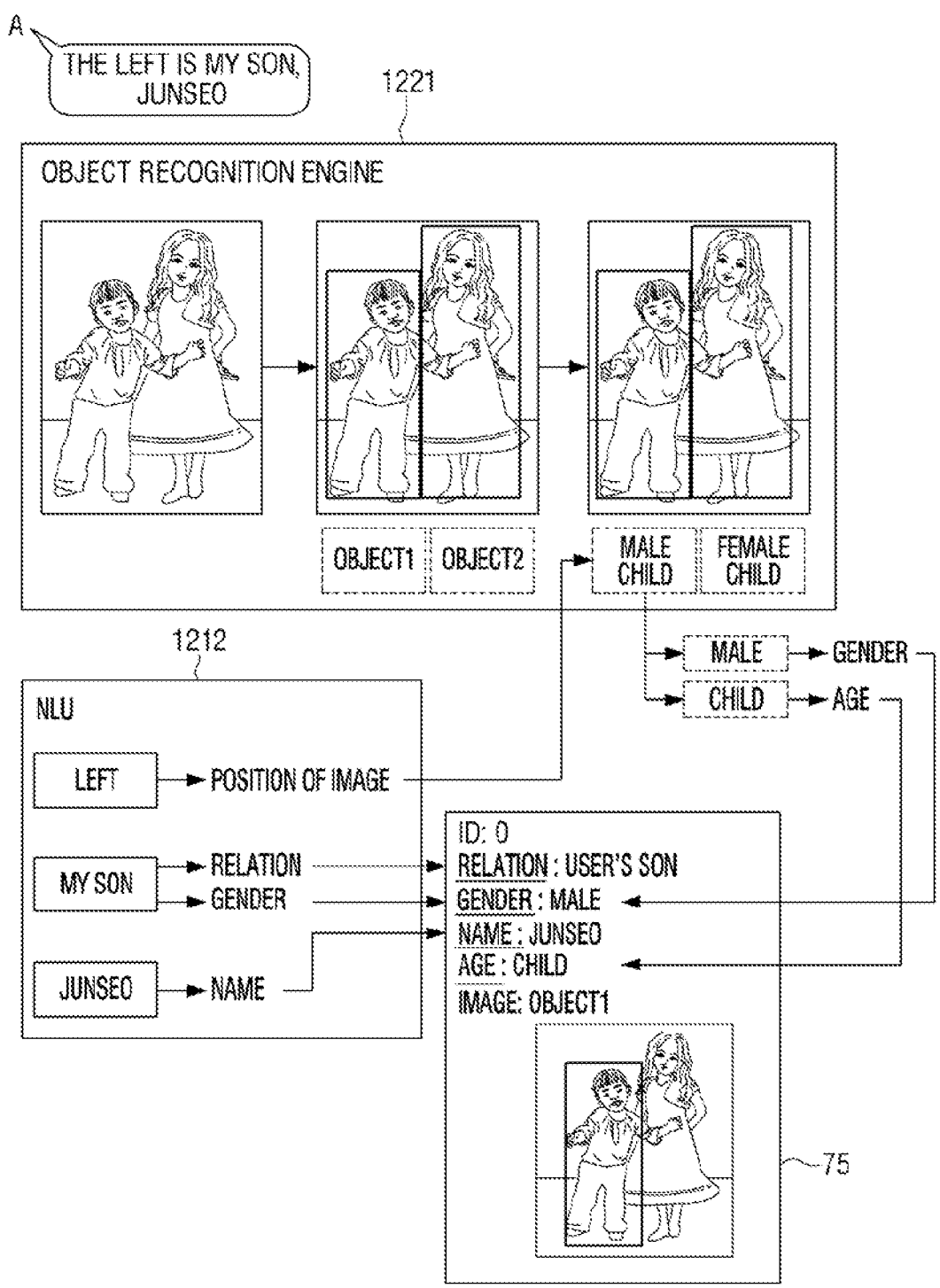
FIG. 13A is a diagram illustrating generating tag information according to an embodiment.

FIG. 13A is a diagram illustrating generating tag information according to an embodiment.

When a user (A) says "the left is my son Junseo" while looking at an image displayed on the electronic apparatus 100, the object recognition engine 1221 may identify objects in the photo, obtain feature information (e.g., gender, age, etc.) of the object through the image analysis, and obtain information on the object position in the image, the relationship of the object, the gender, the name, or the like. The tag information 75 may be generated based on the recognition information for the image and the recognition information for the voice. The tag information 75 may include various information as an attribute, such as, for example, relation, gender, age, color, or the like, depending on the recognition information.

Figure 13B:
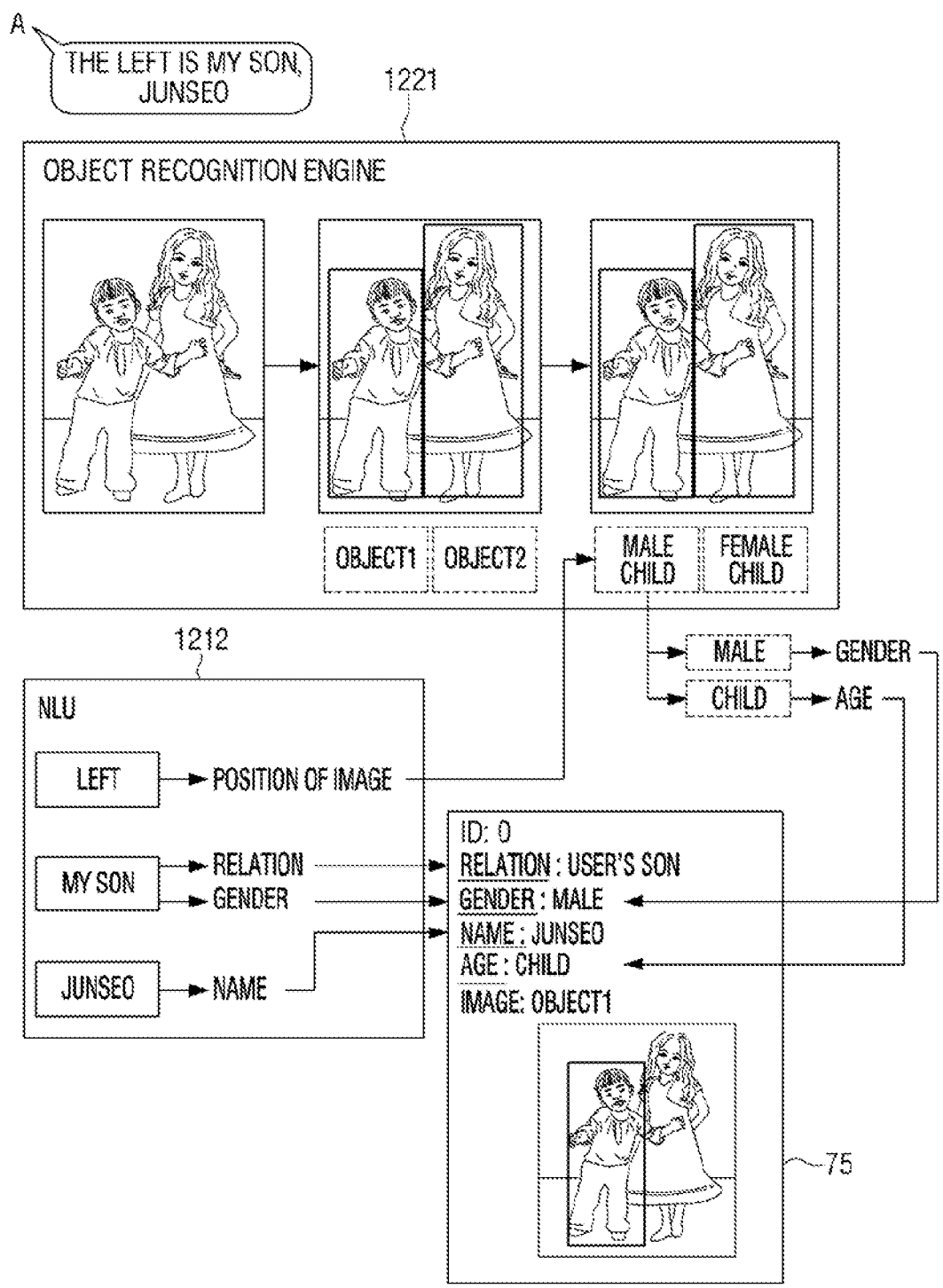
FIG. 13B is a diagram illustrating generating tag information according to an embodiment.

Referring to FIG. 13B, information may be added to the tag information 75 based on an additionally input voice. In this example, abstract information (age: child) grasped by image recognition may be supplemented as detailed information (age: 5) through recognition information for the voice.

Figure 14:
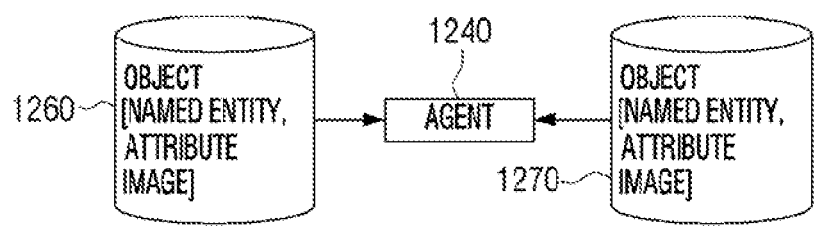
FIG. 14 is a diagram illustrating tagging information sharing according to an embodiment.

Database including tag information may be generated for each user, and a group including various users may share tag information of each other. For example, referring to FIG. 14, a first user's database 1260 and a second user's database 1270 may be generated. The first user's database 1260 and the second user's database 1270 may be stored in a cloud server. Databases for tag information may be shared between designated user groups. The agent 1240 may provide various services based on the database for shared tag information. For example, users belonging to a group may have a dialogue using tag information when having a dialogue. An embodiment will be described with reference to FIG. 15.

Figure 15:
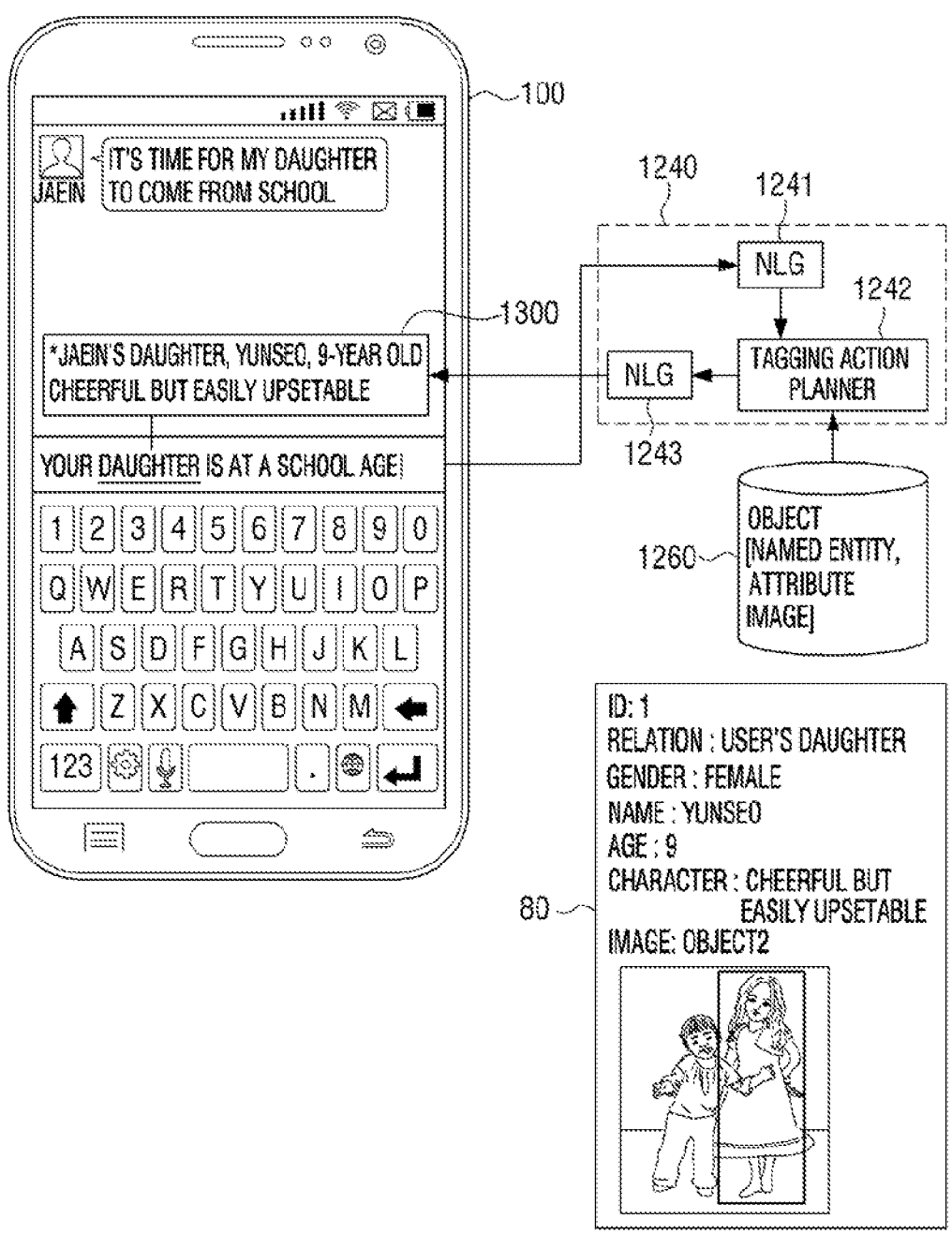
FIG. 15 is a diagram illustrating a manner of tagging information usage according to various embodiments.

FIG. 15 illustrates a chatting screen displayed on the electronic apparatus 100 according to an embodiment. A UI 1300 including information on the daughter of Jaein may be displayed to a user of the electronic apparatus 100 who is not aware of the daughter of a dialogue partner Jaein.

The agent 1240 may include the NLU module 1241, a tagging action planner 1242, and a natural language generation (NLG) module 1243. The agent 1240 may be an A agent. The A agent is a dedicated program for providing an AI-based service (e.g., a voice recognition service, an assistant service, a translation service, a search service, or the like), and may be executed by an existing general purpose processor (e.g. CPU) or a separate AI-only processor (e.g., GPU). The agent 1240 may be mounted on the electronic apparatus 100 or mounted on the external server of the electronic apparatus 100.

The NLU module 1241 performs a natural linguistic understanding process on the text input to the chat screen, and based on the result, the tagging action planner 1242 may obtain tagging information 80 included in the data base 1260 of Jaein. The NLG module 1243 is a module for making the result data in a natural language form, and may generate information in a natural language form based on the tagging information 80, and the UI 1300 including the generated information may be displayed in the electronic apparatus 100.

Figure 16:
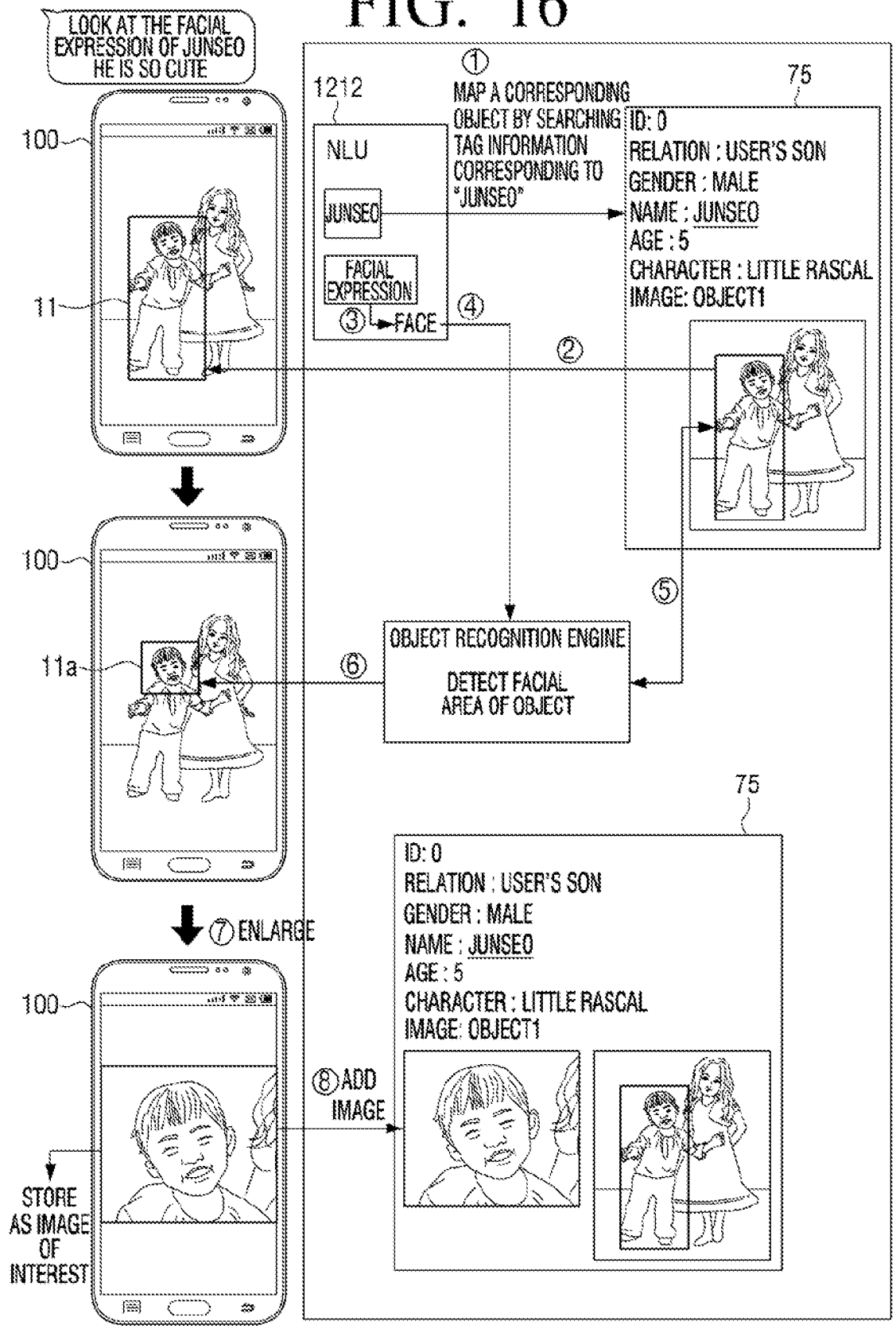
FIG. 16 is a diagram illustrating a manner of tagging information usage according to various embodiments.

FIG. 16 is a diagram illustrating tag information usage according to another embodiment.

Referring to FIG. 16, when a user is interested in a specific portion of an object having tag information, a portion of the object may be enlarged and displayed, and the portion may be separately managed as an image of interest of the user. For example, as shown in FIG. 16, if the user voices "Look at the facial expression of Junseo. He is so cute," natural language analysis is performed through the NLU module 1212, and the tag information 75 corresponding to "Junseo" is searched (①). The object 11 in the image is identified from the tag information 75 (②), and the face is detected as the relevant area in the image from the word "facial expression" obtained in the NLU module 1212 (③④), and the object recognition engine 1221 detects a face area 11a in the object 11 (⑤). The detected area may be enlarged and displayed in the electronic apparatus 100 and added to the tag information 75 (⑦⑧). The electronic apparatus 100 may separately store the detected area in the memory 120 as an image of interest.

Figure 17:
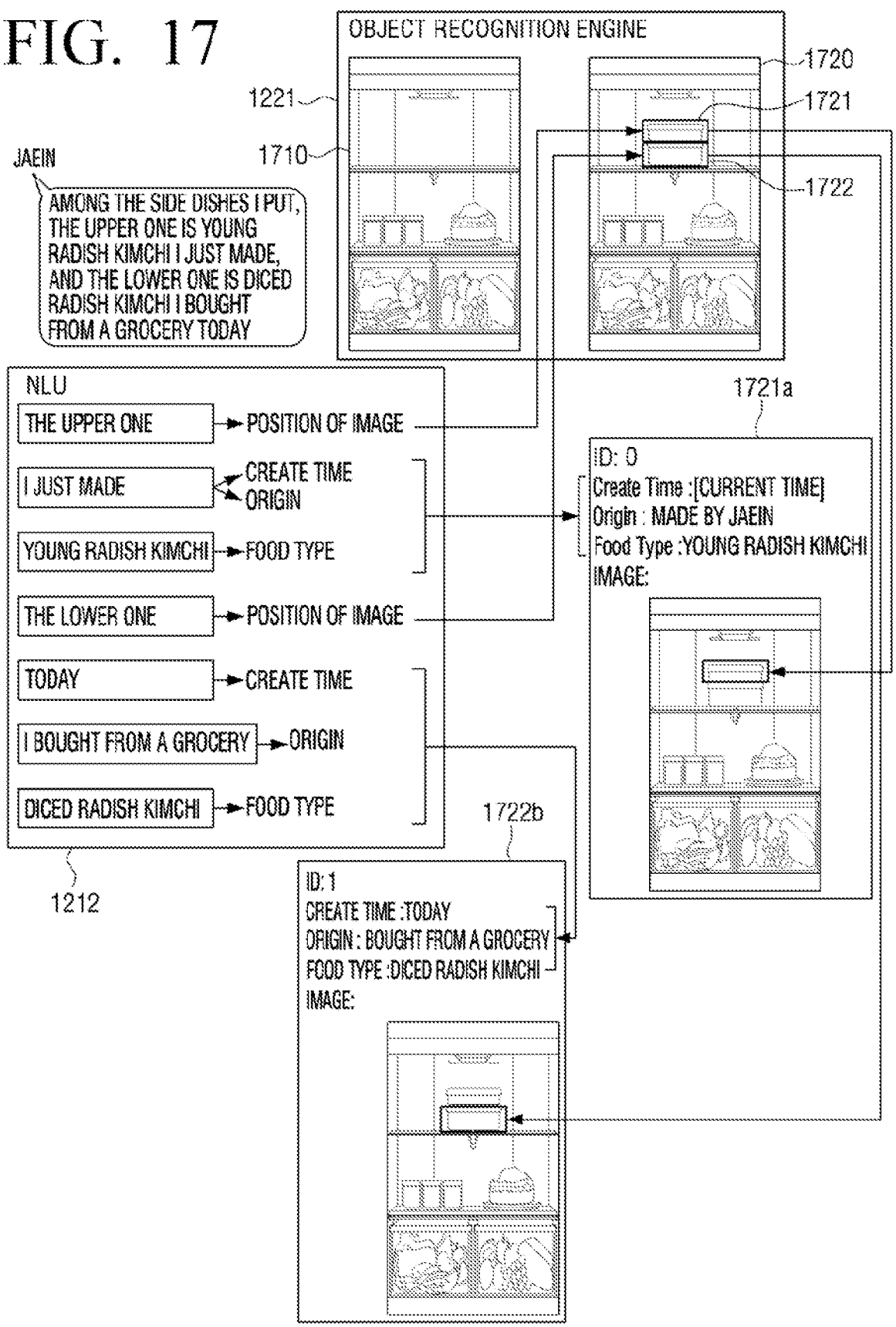
FIG. 17 is a view illustrating various embodiments of generating tag information for a food in a refrigerator.

FIG. 17 is a view illustrating an embodiment of generating tag information for a food in a refrigerator.

The electronic apparatus 100 may be implemented as a refrigerator including a display. Images 1710 and 1720 shown in FIG. 17 is an image of the inside of the electronic apparatus 100 embodied as a refrigerator and may be displayed through a display provided on a front surface of the refrigerator. Referring to FIG. 17, the NLU module 1212 may identify the meaning of the "what is input now" during the utterance of the user (Jaein), and the object recognition engine 1221 may compare the current image 1720 with the previous image 1710 before the event that the refrigerator door is opened and closed to identify newly added objects 1721 and 1722. Based on the information obtained by analyzing the user's utterance by the NLU module 1212, the object recognition engine 1221 may recognize the position of the objects 1721 and 1722 in the current image 1721. Tag information 1721a and 1722b for each of the objects 1721, 1722 may be generated based on information about what the objects 1721, 1722 are (e.g., food type), when the objects 1721, 1722 are created (e.g., create time).

As described above, tag information for foods included in an image of the electronic apparatus 100 embodied in a refrigerator may be generated, and the generated tag information may be stored in a database of a user (Jaein). The tag information may then be provided to Sera who is allowed to share the tag information. The embodiment will be described with reference to FIG. 18.

Figure 18:
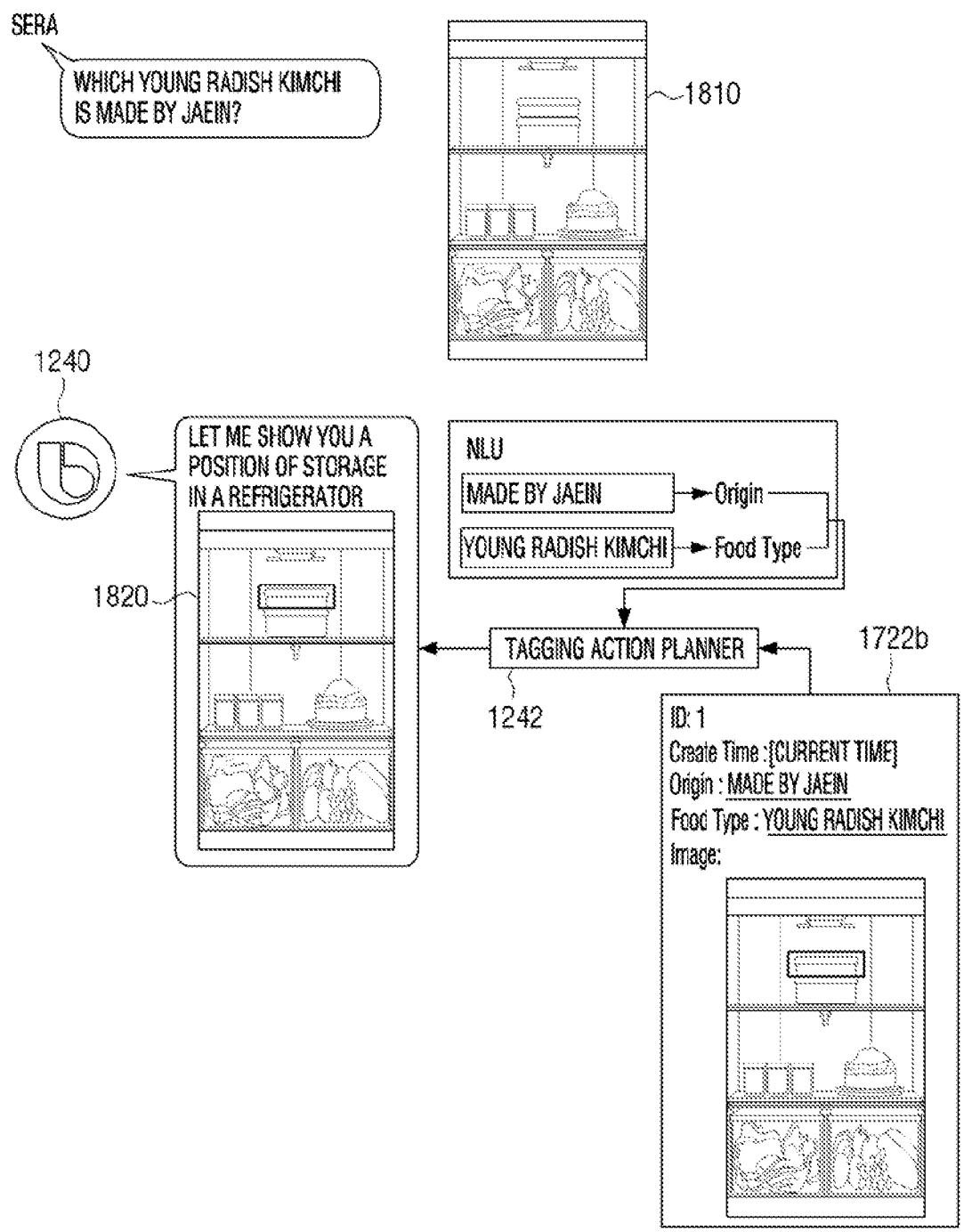
FIG. 18 is a view illustrating various embodiments of generating tag information for a food in a refrigerator.

Referring to FIG. 18, looking at the image 1810 capturing the inside of a refrigerator, if another user (Sera) utters a voice, "which young radish kimchi is made by Jaein?", the NLU module 1212 may analyze the meaning, and the tagging action planner 1242 may obtain information on a position of the object based on the voice recognition result and the tag information 1722b of the database of Jaein. Based on the obtained information, the agent 1240 may output a voice guide, such as "let me show you a position of storage in a refrigerator" along with an image 1820 including a graphical object (a rectangle surrounding the object) for identifying the position of the object. The agent may be mounted on the electronic apparatus 100 embodied in a refrigerator, mounted on a mobile terminal device (e.g., a smartphone), or another separate agent.

The embodiments described above may be implemented by using artificial intelligence (AI) systems. The AI systems are computer systems that implement human-level intelligence in which the machine learns, determines and becomes smart, and the more the AI systems are used, the more the recognition rate is improved.

AI technology may be composed of a technology that learns a model using an AI algorithm that classifies/learns the characteristics of input data by itself and a technology that simulates functions such as recognition and determination of human brain using trained model.

Examples of the trained model include a model for linguistic understanding for recognizing human language/characters, a model for visual understanding for recognizing objects as human vision, a model for inference/prediction for judging and logically inferring and predicting information, and a model for knowledge representation for processing human experience information into knowledge data, or the like.

According to an embodiment, human language and characters may be recognized, applied, and processed using the linguistic understanding model. Relevant functions include natural language processing, machine translation, dialogue system, question/answer, voice recognition/synthesis, or the like.

According to an embodiment, using visual understanding model, recognition of an object in an image, object tracking, image search, human recognition, scene understanding, spatial understanding, or the like, may be performed.

According to an embodiment, using inference/prediction model, knowledge/probability based inference, optimization prediction, preference-based planning, and recommendation, or the like, may be performed.

According to an embodiment, using knowledge representation model, knowledge building (data generation/classification) and knowledge management (data utilization), or the like, may be performed.

According to an embodiment, a new model may be generated and used based on two or more of the various models above.

The learned (or trained) model is a learned determination model based on an artificial intelligence (AI) algorithm, for example, it may be a model based on a neural network. The learned AI model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. Also, the learned AI model may include, for example, a neural network model or a deep learning model developed from a neural network model. In the deep learning model, a plurality of network nodes are located at different depths (or layers), and may transmit and receive data according to a convolution connection relationship. Examples of learned AI models include, but are not limited to, Deep Neural Network (DNN), Recurrent Neural Network (RNN), and Bidirectional Recurrent Deep Neural Network (BRDNN).

Various embodiments may use a personal assistant program that is an AI-dedicated program (or AI agent). The personal assistant program is a dedicated program to provide AI-based service and may be executed by an existing general-purpose processor (e.g., CPU) or separate AI-exclusive processor (e.g., GPU, or the like).

When a predetermined user input (e.g., an icon touch corresponding to a personal assistant chatbot, a user voice including a preset word, or the like) is input or a button (e.g., a button for executing an AI agent) provided in the electronic apparatus 100 is pressed, an AI agent mounted on the electronic apparatus 100 may be operate (or executed). The AI agent may transmit information on the voice of a user and information on an image including the target object to be tagged to an external server, and may provide tagging information based on the data received from the external server.

The AI agent may be previously executed before a predetermined user input is detected or a button provided in the electronic apparatus 100 is selected. In this example, when the tagging function is executed, the AI agent of the electronic apparatus 100 may obtain tagging information based on the image and the user voice. The AI agent may be in a standby state before a predetermined user input is detected or a button provided in the electronic apparatus 100 is selected. Here, the standby state is a state in which a predefined user input is detected to control the start of operation of the AI agent. When the tagging function is executed while the AI agent is in a standby state, the electronic apparatus 100 may operate the AI agent and obtain tagging information based on the image and the user voice.

The above-described embodiments may be implemented using an AI model in a server external to the electronic apparatus 100, or the electronic apparatus 100 may directly use the AI model. In this example, the AI agent mounted on the electronic apparatus 100 may control the AI model to perform the operations of the above-described embodiments.

Figure 19:
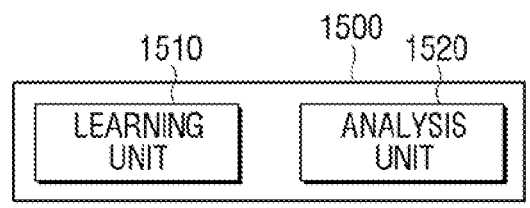
FIG. 19 is a block diagram illustrating a processor for learning and using a recognition model according to an embodiment.

FIG. 19 is a block diagram illustrating a processor for learning and using a recognition model according to an embodiment.

Referring to FIG. 19, a processor 1500 may include at least one of a learning unit 1510 and an analysis unit 1520.

The learning unit 1510 may generate or train an artificial intelligence model using learning data.

For example, the learning unit 1510 may generate, train, or update a model for linguistic understanding by using human language as learning data.

As a still another example, the learning unit 1510 may generate, train, or update a visual understanding model using an image including at least one object as learning data.

As another example, the learning unit 1510 may generate, train, or update a model for object recognition that recognizes (or identifies) an object referred to by a human language refers an image using an image including a human language and at least one object as learning data. The model for object recognition may be generated, trained or updated separately, or may be generated, trained or updated based on a model for linguistic understanding and a model for visual understanding.

The analysis unit 1520 may perform linguistic understanding, visual understanding, object recognition, or the like, by using the predetermined data as input data to a trained model.

For example, the analysis unit 1520 may identify an intention of a user appearing in the voice by using the voice as input data to the linguistic understanding model.

When functionally divided, the linguistic understanding model may include the ASR module. NLU module, and NLG module. The ASR module, NLU module, and NLG module have been described above and thus will not be further described.

As another example, the analysis unit 1520 may obtain (or estimate, infer) information about the at least one object using an image including at least one object as input data in a model for visual understanding. For example, if the image 10 shown in FIG. 1 is used as input data in a model for visual understanding, two of the objects that are classified into humans are detected, and that one is a boy and one is a girl may be obtained.

As another example, the analysis unit 1520 may recognize an object which the user voice in the image refers to with an image including user voice and at least one object as input data for a model for object recognition. Alternatively, the analysis unit 1520 may recognize an object which the user voice in the image refers to using information obtained through the model for linguistic understanding and the model for visual understanding as input data.

For example, at least a portion of the learning unit 1510 and at least a portion of the analysis unit 1520 may be implemented as software modules or at least one hardware chip form and mounted in the electronic apparatus 100. For example, at least one of the learning unit 1510 and the analysis unit 1520 may be manufactured in the form of an exclusive-use hardware chip for artificial intelligence (AI), or a conventional general purpose processor (e.g., a CPU or an application processor) or a graphics-only processor (e.g., a GPU) and may be mounted on various electronic apparatuses as described above. Herein, the exclusive-use hardware chip for artificial intelligence is a dedicated processor for probability calculation, and it has higher parallel processing performance than existing general purpose processor, so it can quickly process computation tasks in artificial intelligence such as machine learning. When the learning unit 1510 and the analysis unit 1520 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

The learning unit 1510 and the analysis unit 1520 may be mounted on one electronic apparatus, or may be mounted on separate electronic apparatuses, respectively. For example, the processor 1500 of FIG. 19 may be a processor 140 of FIG. 2. For example, one of the learning unit 1510 and the analysis unit 1520 may be implemented in the electronic apparatus 100, and the other one may be implemented in an external server. In addition, the learning unit 1510 and the analysis unit 1520 may provide the model information constructed by the learning unit 1510 to the analysis unit 1520 via wired or wireless communication, and provide data which is input to the analysis unit 1520 to the learning unit 1510 as additional data.

Figure 20:
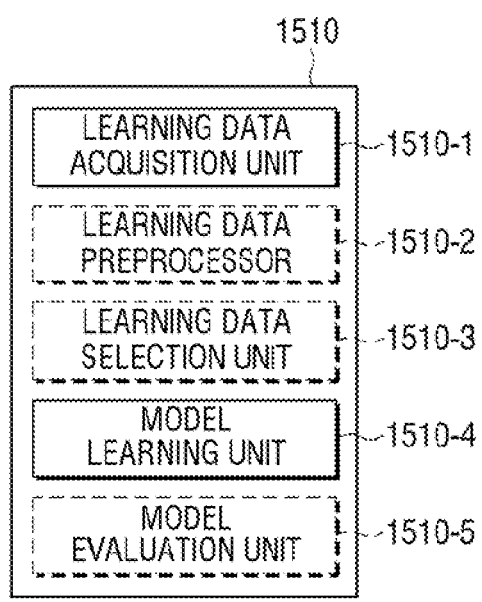
FIG. 20 is a block diagram illustrating a learning unit and an analysis unit according to various embodiments.

FIG. 20 is a block diagram illustrating a learning unit 1510 according to an embodiment.

Referring to FIG. 20, the learning unit 1510 according to some embodiments may implement a learning data acquisition unit 1510-1 and a model learning unit 1510-4. The learning unit 1510 may further selectively implement at least one of a learning data preprocessor 1510-2, a learning data selection unit 1510-3, and a model evaluation unit 1510-5.

The learning data acquisition unit 1510-1 may obtain learning data for training models for linguistic understanding, visual understanding, object recognition, or the like. The learning data may be data collected or tested by the learning unit 1510 or a manufacturer of the learning unit 1510. For example, the learning data may include an image that includes voice, at least one object.

The model learning unit 1510-4 may use the learning data to train a model to have a reference about how to understand, recognize, determine, infer, or the like, the input data. For example, the model learning unit 1510-4 may extract a feature from the input image, project the feature into a vector space, and index the information of the object in each vector to construct a model for visual understanding.

The model learning unit 1510-4 may train a model through supervised learning of at least a part of the learning data. Alternatively, the model learning unit 1510-4 may learn, for example, by itself using learning data without specific guidance to make the artificial intelligence model learn through unsupervised learning which detects a criterion for determination of a situation. Also, the model learning unit 1510-4 may train the model through reinforcement learning using, for example, feedback on whether the result of providing the response according to learning is correct. The model learning unit 1510-4 may also make the model learn using, for example, a learning algorithm including an error back-propagation method or a gradient descent.

In addition, the model learning unit 1510-4 may learn a selection criterion about which learning data should be used for estimating a target of recognition using input data.

The model learning unit 1510-4 may determine a model having a great relevance between the input learning data and the basic learning data as a model to be learned when there are a plurality of models previously constructed. In this case, the basic learning data may be pre-classified according to the type of data, and the model may be pre-constructed for each type of data. For example, the basic learning data may be pre-classified into various criteria such as a region in which the learning data is generated, the time at which the learning data is generated, the size of the learning data, the genre of the learning data, the creator of the learning data, the type of the object in the learning data, or the like.

When the model is trained, the model learning unit 1510-4 may store the trained model. For example, the model learning unit 1510-4 may store the trained model in the memory 120 of the electronic apparatus 100. Alternatively, the model learning unit 1510-4 may store the trained model in a memory of a server connected to the electronic apparatus 100 via a wired or wireless network.

The learning unit 1510 may further implement a learning data preprocessor 1510-2 and a learning data selection unit 1510-3 to improve the processing capability of the model or to save resources or time required for generation of the model.

The learning data preprocessor 1510-2 may preprocess obtained data so that the data obtained in the learning for determining the situation may be used. The learning data preprocessor 1510-2 may process the obtained data into a predetermined format so that the model learning unit 1510-4 may use the obtained data for learning for the determination of a situation.

The learning data selection unit 1510-3 may select data required for learning from the data obtained by the learning data acquisition unit 1510-1 or the data preprocessed by the learning data preprocessor 1510-2. The selected learning data may be provided to the model learning unit 1510-4. The learning data selection unit 1510-3 may select learning data necessary for learning from the obtained or preprocessed data in accordance with a predetermined selection criterion. The learning data selection unit 1510-3 may also select learning data according to a predetermined selection criterion by learning by the model learning unit 15104.

The learning unit 1510 may further include the model evaluation unit 1510-5 to improve a processing ability of the model.

The model evaluation unit 1510-5 may input evaluation data to the model, and if the result which is output from the evaluation data does not satisfy a predetermined criterion, the model evaluation unit 1510-5 may make the model learning unit 1510-4 learn again. In this example, the evaluation data may be predefined data to evaluate the model.

For example, the model evaluation unit 1510-5 may evaluate, among the analysis results of the trained model for the evaluation data, that the analysis result does not satisfy a predetermined criterion when the number or ratio of the evaluation data of which analysis result is not correct exceeds a preset threshold.

When there are a plurality of trained models, the model evaluation unit 1510-5 may evaluate whether each trained model satisfies a predetermined criterion, and determine the model which satisfies a predetermined criterion as a final model. Here, when there are a plurality of models that satisfy a predetermined criterion, the model evaluation unit 1510-5 may determine one or a predetermined number of models which are set in an order of higher evaluation score as a final model.

Figure 21:
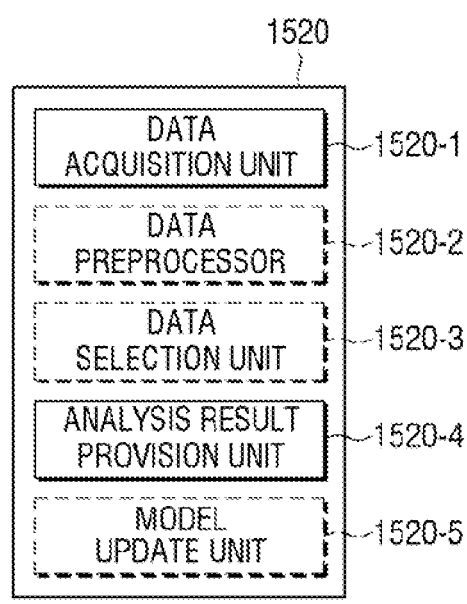
FIG. 21 is a block diagram illustrating a learning unit and an analysis unit according to various embodiments.

Referring to FIG. 21, the analysis unit 1220 according to some embodiments may include the input data acquisition unit 1520-1 and the analysis result provision unit 1520-4. The analysis unit 1520 may further include at least one of a data preprocessor 1520-2, a data selection unit 1520-3, and a model update unit 1520-5 in a selective manner.

The data acquisition unit 1520-1 may obtain data necessary for analysis. The analysis result provision unit 1520-4 may provide a result which is obtained by inputting the data obtained from the data acquisition unit 1520-1 to the trained model. The analysis result provision unit 1520-4 may provide an analysis result in accordance with a purpose of data analysis. The analysis result provision unit 1520-4 applies the data selected by the data preprocessor 1520-2 or the data selection unit 1520-3 to be described later to the model as an input value to obtain the response result. The response result may be determined by the model.

In an embodiment, the analysis result provision unit 1520-4 may obtain (or estimate) information for each object by applying an image including at least one object obtained from the data acquisition unit 1520-1 to a trained model for visual understanding.

In another embodiment, the analysis result provision unit 15204 may apply an image including at least one object and the voice obtained from the data acquisition unit 1520-1 to a trained model for object recognition to recognize (or identify) an object indicated by the voice.

As another embodiment, the analysis result provision unit 1520-4 may determine a user's intention corresponding to the voice by applying voice (voice data) obtained from the data acquisition unit 1520-1 to a trained model for linguistic understanding.

The analysis unit 1520 may further include the data preprocessor 1520-2 and the data selection unit 1520-3 in order to improve an analysis result of the model or save resources or time to provide the analysis result.

The input data preprocessor 1520-2 may preprocess the obtained data so that the obtained data may be used to determine a situation. The data preprocessor 1520-2 may process the obtained data into the pre-defined format by the analysis result provision unit 1520-4.

The data selection unit 1520-3 may select data required for determining a situation from the data acquired by the data acquisition unit 1520-1 or the data preprocessed by the input data preprocessor 1520-2. The selected data may be provided to the analysis result provision unit 15204. The data selection unit 1520-3 can select some or all of the obtained or preprocessed data according to a predetermined selection criterion for determining a situation. The data selection unit 1520-3 can also select data according to a predetermined selection criterion by learning by the model learning unit 1510-4.

The model update unit 1520-5 may control the updating of the model based on the evaluation of the analysis result provided by the analysis result provision unit 1520-4. For example, the model update unit 1520-5 may provide the analysis result provided by the analysis result provision unit 1520-4 to the model learning unit 1510-4 so that the model learning unit 1510-4 may ask for further learning or updating the model.

Figure 22:
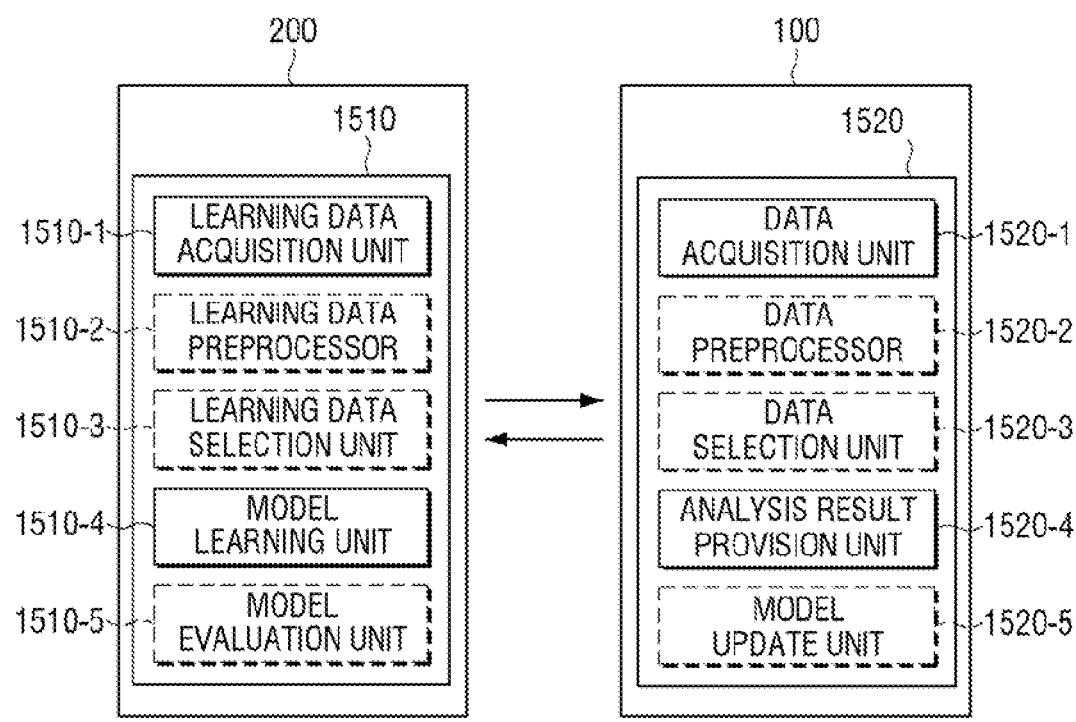
FIG. 22 is a block diagram illustrating a learning unit and an analysis unit according to various embodiments.

FIG. 22 is a diagram illustrating an embodiment in which the learning unit 1510 and the analysis unit 1520 are implemented in different devices.

Referring to FIG. 22, an external server 200 may include the learning unit 1510, and the electronic apparatus 100 may include the analysis unit 1520. The electronic apparatus 100 and the server 200 may communicate with each other on the network.

The analysis result provision unit 1520-4 of the electronic apparatus 100 applies the data selected by the data selection unit 1520-3 to the model generated by the server 200 to obtain the analysis result. The analysis result provision unit 1520-4 of the electronic apparatus 100 may receive the model generated by the server 200 from the server 200, determine a user's intention in the user voice input through the microphone 130 using the received model, obtain object information from an image displayed on the display 110, or identify an object related to user voice in the image.

Figure 23:
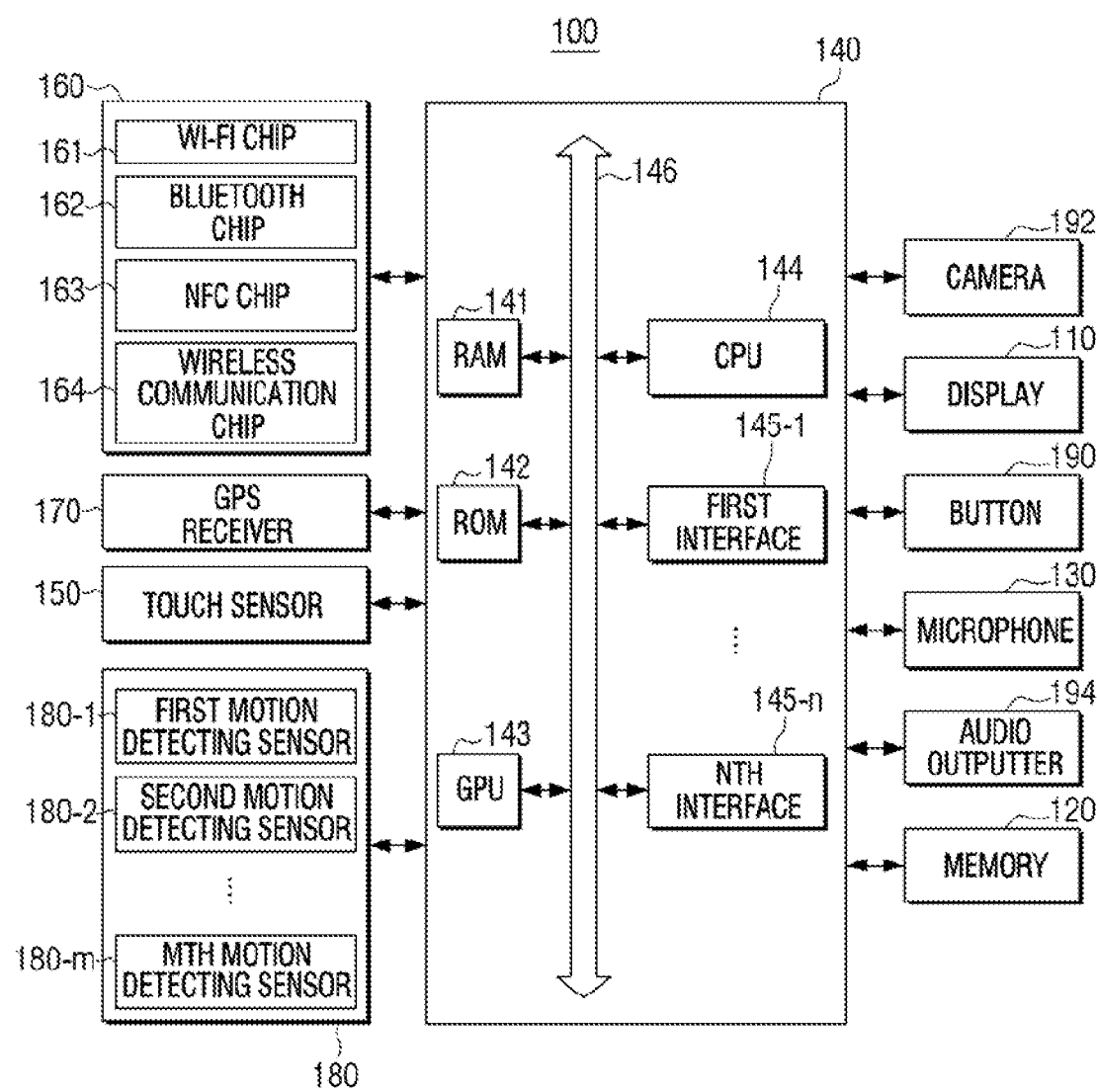
FIG. 23 is a block diagram illustrating a detailed configuration of an electronic apparatus according to an embodiment.

FIG. 23 is a block diagram illustrating a detailed configuration of the electronic apparatus 100 according to an embodiment.

Referring to FIG. 23, the electronic apparatus 100 may include the display 110, the memory 120, the microphone 130, the processor 140, a touch sensor 150, a communicator 160, a global positioning system (GPS) receiver 170, a motion sensor 180, a button 190, a camera 192, and an audio outputter 194. Some of the configurations may be omitted, depending on the embodiment, and appropriate hardware/software configurations as would be apparent to those skilled in the art, although not shown, may be further included in the electronic apparatus 100.

The display 110 is configured to display an image. The display 110 may be the same as the display 110 of FIG. 2. The display 110 may be implemented as a touch screen along with the touch sensor 150 capable of sensing a touch operation of a user.

The touch sensor 150 may sense a touch operation of a user or a pen. The touch sensor 150 includes a touch sensor, and the touch sensor may be implemented by electrostatic type or resistive type. The electrostatic type uses a dielectric coated on the surface of the display layer to sense micro electricity which is excited to the human body when a part of the body of the user is touched on the surface of the display layer, thereby calculating touch coordinates. The resistive type includes two electrode plates so that when a user touches a screen, upper and lower plates of the touched point are contacted to sense flow of current, thereby calculating touch coordinates. As described above, the touch sensor may be implemented in various types.

When the pen is used as an input means, if the pen is a pen including a coil therein, the touch sensor 150 may include a magnetic field detecting sensor capable of sensing a magnetic field changed by a coil inside the pen. Accordingly, the proximity operation, that is, hovering, may be detected as well as the touch operation.

The touch sensor 150 plays a role as an inputter, may receive a selection of an object from a user, and may receive writing of a user or a pen.

The processor 140 may determine the type of touch operation based on a sensing signal sensed by the touch sensor of the touch sensor 150. The touch operation may be of a variety of operations, such as simple touch, tap, touch and hold, move, flick, drag and drop, pinch-in, pinch-out, and the like. The processor 140 may control various configurations of the electronic apparatus 100 according to a user touch sensed by the touch sensor 150.

When the display 110 and the touch sensor 150 are implemented as a touch screen, for example, as illustrated in FIG. 3, touch for an icon 20 for executing a tagging function may be sensed, and as another example, as illustrated in FIG. 8, a user touch for selecting a target object to be tagged may be sensed.

The memory 120 may be the same as the memory 120 of FIG. 2. The memory 120 may store computer executable instructions and the processor 140 may perform various functions of the electronic apparatus 100 by executing computer executable instructions.

According to an embodiment, the memory 120 may store an AI model trained by an AI algorithm. The AI model may include a model for linguistic understanding, a model for visual understanding, and a model for object recognition. The AI model has been described above and will not be further described.

The microphone 130 is configured to receive user voice or other sound to convert the sound to a digital signal. The processor 140 may use user voice input through the microphone 130 to a tagging function.

The communicator 160 is configured to communicate with various types of external devices in accordance with various types communication methods. The communicator 160 may include various communication chips such as a Wi-Fi chip 161, a Bluetooth chip 162, a near field communication (NFC) chip 163, a wireless communication chip 164.

The Wi-Fi chip 161, the Bluetooth chip 162, and the NFC chip 163 perform communication by Wi-Fi method, Bluetooth method, and NFC method, respectively. The NFC chip 163 may communicate by the NFC method using a 13.56 MHz band among various RF-ID frequency bands such as 135 kHz, 13.56 MHz, 433 MHz, 860~960 MHz, 2.45 GHz, or the like. When using the Wi-Fi chip 161 or the Bluetooth chip 162, various connection information such as service set identifier (SSID) may be transmitted and received for communication connection and then various information may be transmitted and received. The wireless communication chip 164 may communicate according to various communication specifications such as IEEE, Zigbee, $3^{rd}$ generation (3G), $3^{rd}$ generation partnership project (3GPP), long term evolution (LTE), or the like.

In addition to the communication methods as described above, the communicator 160 may perform communication with various external devices through at least one communication method among infrared data association (IrDA), radio frequency identification (RFID), ultra-wideband (UWB), WirelessDisplay (WiDi), wirelessHD (WiHD), wireless home digital interface (WHDI), Miracast, wireless gigabit alliance (Wigig), Wi-Fi direct, AirPlay, Z-wave, internet protocol version 4 (IPv4) over low-power wireless personal area networks (4LoWPAN), general packet radio service (GPRS), weightless, digital living network alliance (DLNA). ANT+, digital enhanced cordless telecommunications (DECT), wireless local area network (WLAN), global system for mobile communications (GSM), universal mobile telecommunications system (UMTS), wireless broadband (WiBRO), or the like.

According to an embodiment, the communicator 160 may communicate with an external server. The external server may store a model for visual understanding, a model for linguistic understanding, a model for object recognition, or the like, and the processor 140 may control the communicator 160 to transmit the image and the voice to the external server when the user voice is input through the microphone 120 while the image including at least one object is displayed on the display 110.

According to an embodiment, when the tag information for the object included in an image is generated in an external server, the external server may transmit tag information to the electronic apparatus 100 and receive tag information from the external server through the communicator 160.

According to another embodiment, the electronic apparatus 100 itself may generate tag information. In this example, the processor 140 may control the communicator 160 to transmit the image and voice to the external server where the AI model for image analysis and voice recognition is stored, and if the information on the object in the image from the external server and the voice recognition result are received through the communicator 160, the processor 140 may identify the object related to the voice in the image based on the received information, and generate tag information for the identified object.

The motion sensor 180 may include a plurality of motion detecting sensors 180-1 to 180-*m*.

The plurality of motion detecting sensors 180-1 to 180-*m* are sensors for sensing a rotation state of the electronic apparatus 100, the position of the user, and the like. The sensor for sensing the rotation state may be a geomagnetic sensor, an acceleration sensor, a gyro sensor, or the like. The acceleration sensor outputs a sensing value corresponding to the gravitational acceleration which changes according to the slope of a device to which the sensor is attached. The gyro sensor is a sensor that detects the angular velocity by measuring the force of the Coriolis force acting in that velocity direction when rotational movement occurs. The geomagnetic sensor is a sensor for sensing an azimuth angle. Sensors for sensing the location of a user include an image sensor, an infrared sensor, an ultrasonic sensor, and a proximity sensor.

The camera 192 is configured to capture a subject for photography to generate a photographed image. According to an embodiment, tag information for an object included in the image photographed and generated using the camera 192 may be generated.

The GPS receiver 170 is configured to receive a GPS signal from a global positioning system (GPS) satellite and calculate a current position of the electronic apparatus 100. When the tagging function is executed, the processor 140 may calculate the current position using the GPS signal received by the GPS signal receiver 170, and generate information about the current position as tag information for the image.

The button 190 may be various types of buttons such as a mechanical button, a touch pad, a wheel, and the like formed in an arbitrary area such as a front surface portion, a side surface portion, and a back surface portion of the main body of the electronic apparatus 100. The button 190 may be a power button to turn on or turn off power.

The processor 140 may perform a control operation according to the user voice input through the microphone 130, the user motion detected by the motion sensor 180, the user motion captured through the camera 192, or the like. That is, the electronic apparatus 100 may operate in a motion control mode or a voice control mode, in addition to a general mode controlled by a user's touch or a button operation. When operating in the motion control mode, the processor 140 may track the motion change of the user and perform a corresponding control operation. When operating in the voice control mode, the processor 140 may operate in a voice recognition mode that performs a control operation according to user voice input through the microphone 130.

The audio outputter 194 is configured to output audio and may include a speaker and/or an earphone terminal. When a microphone is provided in an earphone, a user voice may be received through the earphone terminal.

The processor 140 may control overall operations of the electronic apparatus 100. For example, the processor 140 may control overall operations of the electronic apparatus 100 using various modules stored in the memory 120. The processor 140 may be the same as the processor 140 of FIG. 1.

The processor 140 includes at least one of a random access memory (RAM) 141, a read-only memory (ROM) 142, a graphics processing unit (GPU) 143, a central processing unit (CPU) 144, a first to $n^{th}$ interfaces 145-1~145-n, and a bus 146. The RAM 141, the ROM 142, the GPU 143, the CPU 144, the first to $n^{th}$ interfaces 145-1 to 145-n, or the like, may be interconnected through the bus 146.

The ROM 142 stores one or more instructions for booting the system and the like. When the turn-on instruction for the electronic apparatus 100 is input and power is supplied, the CPU 144 copies the OS stored in the memory 120 to the RAM 141 according to the stored one or more instructions in the ROM 142, and executes the OS to boot the system. When the booting is completed, the CPU 144 copies various application programs stored in the memory 120 to the RAM 141, executes the application program copied to the RAM 141, and performs various operations. The CPU 144 may perform various operations using various program modules, data, or the like, stored in the memory 120.

When booting of the electronic apparatus 100 is completed, the GPU 143 may display an image. The GPU 143 may generate a screen including various objects such as icons, images, text, and the like, using a calculator and a renderer. Here, a calculator may calculate an attribute value such as a coordinate value, a shape, a size, and a color to be displayed by each object according to the layout of the screen. A renderer may generate display screens of various layouts including objects based on the attribute value calculated by the calculator. A screen generated by the renderer is provided to the display 110 and is displayed in a display region.

The first to $n^{th}$ interface 145-1 to 145-n are connected to the various elements 110-130, 150-194 described above. One of the interfaces may be a network interface connected to an external device through the network.

The processor 140 may control the display 110 to display an image including at least one object, input the voice received through the microphone 130 to the AI model trained by the AI algorithm, identify an object related to the voice of the at least one object included in the image, obtain tag information for the identified object, and provide the obtained tag information. For example, as shown in FIG. 1, processor 140 may provide tag information 12 via the display 110.

The processor 140 may input the displayed image to a first AI model to obtain information on at least one object included in the image, and identify an object related to the voice of the at least one object based on information on the at least one object and a word included in the voice received through the microphone 130. The processor 140 may input voice received via the microphone 130 to a second AI model to obtain tag information including the keyword of the voice. The first AI model and the second AI model may be stored in the memory 120.

The processor 140 may control the display 110 to display a keyword of the voice along with an image. For example, as illustrated in FIG. 1, the tag information 12 including a keyword of the voice may be displayed on the image 10.

The processor 140 may control the display 110 to display the keyword of the voice subsequently input along with the keyword which is displayed previously. For example, referring to FIG. 1, the keyword "5 years" of "he is only 5 years old" that is subsequently input after "the left is my son Junseo" may be displayed along with the keywords "son" and "Junseo" which are previously displayed.

The processor 140 may control the display 110 to display a UI element to display a keyword of the voice included as the tag information and simultaneously delete each word. For example, the processor 140 may control the display 110 to display a UI element 40 as illustrated in FIG. 5.

The processor 140 may identify a first object associated with the received voice in an image and obtain tag information for the first object with reference to the generated tag information for a second object included in the image. For example, as described with reference to FIGS. 9-10, new tag information may be generated with reference to the generated tag information.

When the object associated with the received voice is identified from the image, the processor 140 may control the display 110 to display a UI element indicating that the identified object is the target object to be tagged. For example, as illustrated in FIG. 1, a rectangular UI element surrounding the target object 11 to be tagged as illustrated in FIG. 1 may be displayed.

When a plurality of objects associated with the voice are identified in the image, the processor 140 may obtain tagging information for each of the plurality of objects on the basis of the voice. For example, as shown in FIG. 7, the processor 140 may obtain tag information for each of the first object (Junseo) and the second object (Yunseo) in the image based on the voice.

The processor 140 may store the obtained tag information associated with the image in the memory 120.

Figure 24:
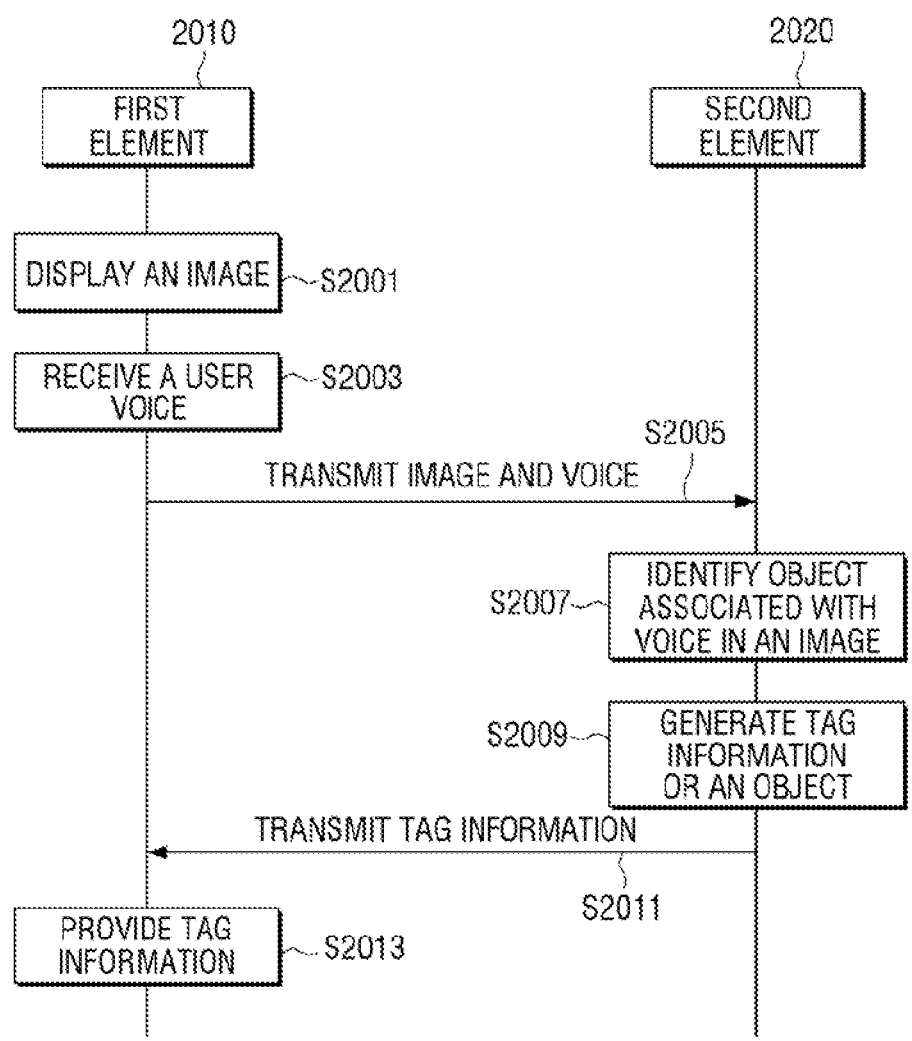
FIG. 24 is a flowchart of a network system using a recognition model according to various embodiments.
Figure 25:
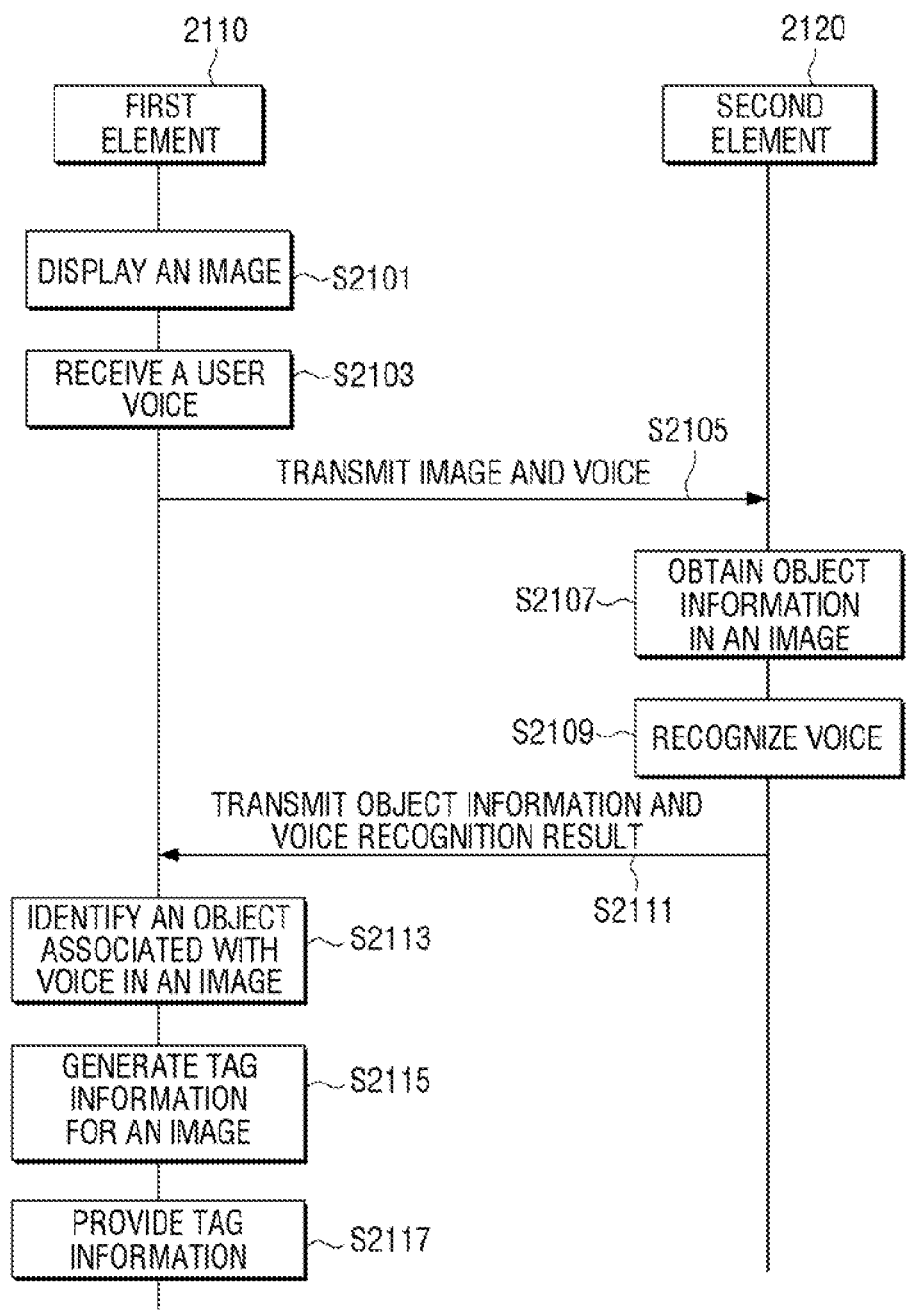
FIG. 25 is a flowchart of a network system using a recognition model according to various embodiments.

FIGS. 24 and 25 are flowcharts of a network system using an AI model according to various embodiments.

Referring to FIGS. 24 and 25, the network system using the AI model may include first elements 2010, 2110 and second elements 2020, 2120.

The first elements 2010, 2110 may be the electronic apparatus 100. The second element 2020, 2120 may be a server in which the AI model is stored. Alternatively, the first element 2010, 2110 may be a general-purpose processor, and the second element 2020, 2120 may be an AI-only processor. Alternatively, the first element 2010, 2110 may be at least one application, and the second element 2020, 2120 may be an operating system (OS). That is, the second element 2020, 2120 may be an element that is more integrated, dedicated, with less delay, with better performance, or with larger resources and may be an element that may process more processing required for generating, updating, or applying a model more quickly and effectively than the first element 2010, 2110.

An interface for transmitting or receiving data between the first element 2010, 2110 and the second element 2020, 2120 may be defined.

For example, an application program interface (API) that has learning data to be applied to the model as a factor value (or an intermediate value or a transfer value) may be defined.

The API may be defined as a set of sub-routines or functions that may be called for any processing of another protocol (e.g., a protocol defined in the external server of the electronic apparatus 100) from any one protocol (e.g., the protocol defined in the electronic apparatus 100). That is, an environment in which the operation of another protocol may be performed in one protocol through the API may be provided.

Referring to FIG. 24, the first element 2010 may display an image including at least one object in operation S2001.

While an image including at least one object is being displayed, the first element 2010 may receive a user voice in operation S2003.

When the user voice is input, the first element 2010 may transmit the image and the voice to the second element 2020 in operation 52005.

The second element 2020 may identify an object associated with the voice in the image based on the received voice and image in operation S2007.

The second element 2020 may input a model for visual understanding of the image to obtain information about the included object in the image. For example, information about a position, a type of an object, a color of an object, a size of an object, a name of an object, a gender of an object, or the like, may be obtained as information on the object.

The second element 2020 may input the voice into a model for linguistic understanding to obtain information about the user intent which the voice indicates. For example, the information about a user intention indicating whether a voice is a request for an action, whether a speaker requests a value of a certain variable to a listener (WH-Question), or whether the speaker requests an answer of YES/NO to a listener (YN-Question), or the speaker informs the listener, or the like, information indicating an action desired by the voice, information indicating a keyword included in the voice may be obtained.

The second element 2020 may identify an object associated with the voice in the image based on information about the object and information about the user intention which the voice indicates. For example, the second element 2020 may determine a word to identify a target object to be tagged among the keywords included in the voice and identify an object associated with the voice based on the determined word. For example, a word for identifying an object may be associated with at least one of a description of the appearance of the object, a description of the gender of the object, a description of the color of the object, a description of the position of the object, a description of the object's category, a description of the object's name, or the like. For example, a word for identifying an object in the voice "the left is my son. Junseo" may be determined to be "left", based on which an object located in the left within the image may be identified as an object associated with the voice.

The second element 2020 may generate tag information for the identified object in operation S2009. According to one embodiment, the second element 2020 may determine a word to describe an object of the keywords of voice and include the determined word to generate tag information. For example, a word for describing an object in the voice "the left is my son, Junseo" may be determined to be "son" and "Junseo," and based on it, tag information that includes the texts "son" and "Junseo" for the object located in the left in the image may be generated.

The second element 2020 may transmit the generated tag information to the first element 2010. The first element 2010 may provide tag information in operation S2013. For example, as shown in FIG. 1, the tag information 12 may be provided around the target object 11 to be tagged.

FIG. 25 is a flowchart of a network system using a recognition model according to another embodiment.

Referring to FIG. 25, the first element 2110 may display an image including at least one object in operation S2101.

While an image including at least one object is being displayed, the first element 2110 may receive the user voice in operation 52103.

When the user voice is input, the first element 2110 may transmit the image and the voice to the second element 2120 in operation S2105.

The second element 2120 may obtain information on the object included in the received image in operation S2107.

The second element 2120 may input a model for visual understanding of the image to obtain information about the included object in the image. For example, information about the type of the object, the color of the object, the size of the object, the name of the object, the gender of the object, or the like, may be obtained as information about the object.

The second element 2120 may recognize the received voice in operation S2109.

The second element 2120 may input the voice into a model for linguistic understanding to recognize the voice. For example, the second element 2120 may identify the information about a user intention indicating whether a voice is a request for an action, whether a speaker requests a value of a certain variable to a listener (WH-Question), or whether the speaker requests an answer of YES/NO to a listener (YN-Question), or the speaker informs the listener, or the like, determine information indicating an action desired by the voice and information indicating a keyword included in the voice.

The second element 2120 may transmit the obtained object information and the voice recognition result to the first element 2110 in operation S2109.

The first element 2110 may identify the object associated with the voice from the image based on the received information on the object and the voice recognition result in operation S2111.

The voice recognition result received from the second element 2120 may include information about the keyword of voice. The first element 2110 may determine a word for identifying an object of the keywords of voice and identify an object in the image having information corresponding to the determined word.

The first element 2110 may generate the tag information for the identified object in operation S2113.

The first element 2110 may determine a word for describing the identified object among the keywords of the voice and generate the tag information including the determined word.

The first element 2110 may provide the generated tag information in operation S2115. For example, the tag information may be displayed through the display of the first element 2110.

Figure 26:
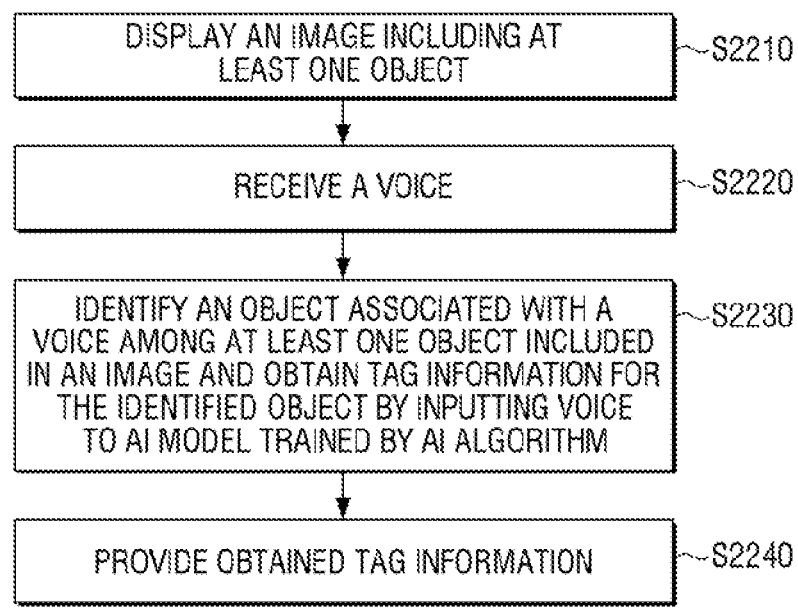
FIG. 26 is a flowchart illustrating a control method of an electronic apparatus according to an embodiment.

FIG. 26 is a flowchart illustrating a method of controlling an electronic apparatus according to an embodiment. The flowchart shown in FIG. 26 may be configured with operations that are processed in the electronic apparatus 100 described herein. Accordingly, the content described with respect to the electronic apparatus 100 may also be applied to the flowchart shown in FIG. 26, even though omitted below.

Referring to FIG. 26, the electronic apparatus 100 displays an image including at least one object in operation S2210. This image may be pre-stored in the memory 120 of the electronic apparatus 100. For example, the image has been photographed through the camera 192.

The electronic apparatus 100 may receive the voice in operation S2220. The voice may be received through the microphone 130 provided in the electronic apparatus 100. The electronic apparatus 100 may remove an ambient noise, or the like, from the voice received through the microphone.

The electronic apparatus 100 may input the voice to an AI model trained by an AI algorithm to identify an object related to the voice of at least one object included in the image and obtain tag information for the identified object in operation S2230. The AI model may be stored in the electronic apparatus 100. Alternatively, the AI model may be stored in a server external to the electronic apparatus 100, and the electronic apparatus 100 may provide the voice to an external server.

According to an embodiment, the electronic apparatus 100 may input the image to the first AI model to obtain information about the at least one object, and identify an object related to the voice of the at least one object based on information on the at least one object and a word included in the voice in operation S2230.

In this example, the electronic apparatus 100 may input the voice to the second AI model to obtain tag information including a keyword of the voice. The tag information may further include information on the identified object among information about the at least one object obtained by inputting the image to the first AI model.

According to another embodiment, in step S2230, the electronic apparatus 100 may identify the first object associated with the voice and obtain tag information for the first object with reference to the generated tag information for a second object included in the image.

According to another embodiment, the electronic apparatus 100 may obtain tagging information for each of the plurality of objects based on the voice when a plurality of objects associated with the voice in the image are identified in operation S2230.

The electronic apparatus 100 may provide the obtained tag information in operation S2240.

According to an embodiment, in step S2240, a keyword of voice may be displayed together with an image. In this example, the electronic apparatus 100 may display the keywords of the input voice together with the previously displayed keywords. The electronic apparatus 100 may also display a UI element for deleting a keyword of voice from the tag information.

The electronic apparatus 100 may store the tag information associated with the image. For example, the memory 120 of the electronic apparatus 100 may store tag information. Alternatively, tag information may be stored in an external server. In this example, the tag information may be shared with other users.

According to the various embodiments described above, tag information of an image may be generated by only describing an image, and in particular, tag information may be generated for an identified object by identifying an object to be tagged in the voice of a user, thereby improving the convenience of a user using a tagging function.

The various embodiments described above may be implemented in a non-transitory computer-readable recording medium, which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. Each of the above-described software modules may perform one or more of the functions and operations described herein.

In accordance with the embodiment of the present disclosure, the various embodiments described above may be practiced with other computer-readable media including instructions stored on a machine-readable storage medium. The device may include an electronic device (e.g., electronic device 100) in accordance with the disclosed embodiments as an apparatus that is operable to invoke stored instructions from the storage medium and act upon the called instructions. When an instruction is executed by a processor, the processor may perform the function corresponding to the instruction, either directly, or using other components under the control of the processor. The instructions may include code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

Also, in accordance with one embodiment of the present disclosure, a method according to various embodiments described above may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily, or at least temporarily, in a storage medium such as a manufacturer's server, a server of an application store, or a memory of a relay server.

Further, each of the components (for example, modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. A control method of an electronic apparatus, the method comprising:
displaying an image including a plurality of objects;

receiving a voice of a user;
obtaining first feature information on the plurality of objects by inputting the image to a first AI model;
obtaining second feature information of the voice by inputting the voice to a second AI model;
comparing the first feature information with the second feature information;
identifying an object whose first feature information matches a portion of the second feature information, from among the plurality of objects in the image, based on the comparison;
generating tag information corresponding to the identified object based on the second feature information; and
providing the tag information for the identified object,
wherein the second feature information comprises personalized information which is reflected with a unique thinking of the user and a feeling of the user.

2. The method of claim 1, wherein the tag information further comprises information on the identified object among the first feature information.

3. The method of claim 1, wherein the obtaining the second feature information comprises inputting the voice into the second AI model and receiving, as an output from the second AI model, at least one keyword, and
wherein the providing comprises displaying the at least one keyword along with the image.

4. The method of claim 3, further comprising:
displaying a keyword of a voice subsequently input along with the at least one keyword previously displayed.

5. The method of claim 1, further comprising:
displaying a user interface (UI) element to delete the second feature information of the voice from the tag information.

6. The method of claim 1, wherein the identifying the object comprises identifying a first object associated with the voice and obtaining tag information for the first object by referring to pre-generated tag information associated with a second object included in the image.

7. The method of claim 1, further comprising:
based on the object associated with the voice being identified, displaying a UI element notifying that the identified object is a target object to be tagged.

8. The method of claim 1, wherein the obtaining the first feature information comprises, based on the plurality of objects associated with the voice being identified from the image, obtaining tagging information for each of the plurality of objects based on the voice.

9. The method of claim 1, further comprising:
storing the tag information associated with the image.

10. The method of claim 1, wherein the obtaining the second feature information comprises inputting the voice into the second AI model and receiving, as an output from the second AI model, one or more keywords, and
wherein the tag information is generated from the one or more keywords.

11. An electronic apparatus comprising:
a display;
a microphone;
a memory configured to store computer executable instructions; and
a processor configured to execute the computer executable instructions to:
control the display to display an image including a plurality of objects,
receive a voice of a user through the microphone,
obtain first feature information on the plurality of objects, by inputting the image to a first AI model,
obtain second feature information of the voice by inputting the voice to a second AI model,
compare the first feature information with the second feature information,
identify an object whose first feature information matches a portion of the second feature information, from among the plurality of objects in the image, based on the comparison,
generate tag information corresponding to the identified object based on the second feature information, and
provide the tag information for the identified object,
wherein the second feature information comprises personalized information which is reflected with a unique thinking of the user and a feeling of the user.

12. The electronic apparatus of claim 11, wherein the tag information further comprises information on the identified object among the first feature information obtained by inputting the image to the first AI model.

13. The method of claim 1, wherein a plurality of keywords of the voice are identified by inputting the voice to the second AI model, and receiving, as an output from the second AI model, the plurality of keywords,
the object among the plurality of objects in the image is identified based on one or more first keywords of the plurality of keywords, and
the tag information corresponding to the identified object is generated based on the first feature information and one or more second keywords among the plurality of keywords.

14. The electronic apparatus of claim 11, wherein the processor is configured to identify a plurality of keywords of the voice by inputting the voice to the second AI model, and receiving, as an output from the second AI model, the plurality of keywords,
identify the object among the plurality of objects in the image based on one or more first keywords of the plurality of keywords, and
generate the tag information corresponding to the identified object based on the first feature information and one or more second keywords among the plurality of keywords.

15. The electronic apparatus of claim 11, wherein the second feature information is obtained by inputting the voice into the second AI model and receiving, as an output from the second AI model, one or more keywords, and
wherein the tag information is generated from the one or more keywords.

* * * * *